US010766303B2

(12) United States Patent
Boyl-Davis

(10) Patent No.: US 10,766,303 B2
(45) Date of Patent: Sep. 8, 2020

(54) POSITIONING SYSTEMS

(71) Applicant: The Boeing Company, Chicago, IL (US)

(72) Inventor: Theodore Martin Boyl-Davis, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 234 days.

(21) Appl. No.: 15/896,113

(22) Filed: Feb. 14, 2018

(65) Prior Publication Data

US 2018/0178583 A1 Jun. 28, 2018

Related U.S. Application Data

(62) Division of application No. 14/568,985, filed on Dec. 12, 2014, now Pat. No. 9,937,751.

(51) Int. Cl.
*B60B 19/12* (2006.01)
*B60B 33/00* (2006.01)
*B62B 3/00* (2006.01)
*B62B 3/02* (2006.01)
*B60B 33/04* (2006.01)

(52) U.S. Cl.
CPC ...... *B60B 33/0044* (2013.01); *B60B 33/0018* (2013.01); *B62B 3/001* (2013.01); *B62B 3/02* (2013.01); *B60B 33/04* (2013.01)

(58) Field of Classification Search
CPC .......... B23Q 3/108; F16H 25/183; F16M 7/00
USPC ......................................................... 280/86
See application file for complete search history.

(56) References Cited

U.S. PATENT DOCUMENTS

| | | | | |
|---|---|---|---|---|
| 3,774,352 A * | 11/1973 | Weber | ............... | B23Q 3/108 |
| | | | | 451/406 |
| 3,789,947 A | 2/1974 | Blumrich | | |
| 3,876,255 A | 4/1975 | Ilon | | |
| 4,053,255 A * | 10/1977 | Taylor | ............... | F04D 1/063 |
| | | | | 415/127 |
| 4,213,509 A * | 7/1980 | Hafner | ............... | B21B 31/30 |
| | | | | 177/199 |
| 4,944,492 A * | 7/1990 | Nonaka | ............... | B23Q 1/58 |
| | | | | 254/109 |
| 4,981,209 A | 1/1991 | Sogge | | |
| 5,566,414 A * | 10/1996 | Nonaka | ............... | E01D 19/04 |
| | | | | 14/73.5 |
| 5,701,966 A | 12/1997 | Amico | | |
| 5,722,639 A * | 3/1998 | Nonaka | ............... | B24B 41/06 |
| | | | | 254/104 |
| 6,408,230 B2 | 6/2002 | Wada | | |

(Continued)

OTHER PUBLICATIONS

Notice of Allowance, dated Nov. 16, 2017, regarding U.S. Appl. No. 14/568,985, 9 pages.

*Primary Examiner* — Toan C To
(74) *Attorney, Agent, or Firm* — Yee & Associates, P.C.

(57) ABSTRACT

A method and apparatus for positioning a manufacturing tool. A wheel assembly comprises a wheel plate and rollers. The wheel plate has a perimeter and an axis of rotation that is tiltable about a tilt axis. The rollers are arranged near the perimeter of the wheel plate, each of the rollers having an axis of rotation parallel to the tilt axis. An apparatus comprises an upper frame, a lower frame associated with the upper frame, a wedge slideably located between the upper frame and the lower frame, and a force applicator associated with the wedge.

20 Claims, 25 Drawing Sheets

(56) References Cited

U.S. PATENT DOCUMENTS

| | | | |
|---|---|---|---|
| 6,810,976 B2 | 11/2004 | Rohrs | |
| 7,552,517 B2 * | 6/2009 | McKee | B65G 15/00 |
| | | | 24/456 |
| 7,793,553 B2 * | 9/2010 | Lindeman | G01N 3/04 |
| | | | 73/760 |
| 7,827,868 B2 * | 11/2010 | Lindeman | G01N 3/04 |
| | | | 73/760 |
| 7,980,335 B2 | 7/2011 | Potter | |
| 8,540,038 B1 | 9/2013 | Ullman | |
| 8,556,279 B2 | 10/2013 | McKinnon | |
| 8,579,056 B1 | 11/2013 | Frank | |
| 8,944,446 B1 | 2/2015 | Cottingham | |
| 9,925,991 B2 * | 3/2018 | Hou | B61K 5/04 |
| 10,082,241 B2 * | 9/2018 | Janway | F16M 13/022 |
| 2005/0212243 A1 | 9/2005 | Terry | |
| 2010/0139996 A1 | 6/2010 | Takenaka et al. | |
| 2011/0231013 A1 | 9/2011 | Smoot et al. | |
| 2016/0167430 A1 | 6/2016 | Boyl-Davis | |

\* cited by examiner

POSITIONING SYSTEMS

CROSS REFERENCE TO RELATED APPLICATIONS

This application is related to the following U.S. patent application Ser. No. 14/568,985, entitled "Positioning Systems,", filed Dec. 12, 2014, now U.S. Pat. No. 9,937,751 issued Apr. 10, 2018 and is incorporated herein by reference in its entirety.

BACKGROUND INFORMATION

1. Field

The present disclosure relates generally to positioning systems. More particularly, the present disclosure relates to positioning systems for manufacturing equipment. Yet more specifically, the present disclosure relates to a wheel assembly and wedge jack for positioning mobile manufacturing tools in a manufacturing environment.

2. Background

A manufacturing environment may include manufacturing tools that are automated. It may be desirable to move a height of a manufacturing tool. To move the height of the manufacturing tool, the base of the manufacturing tool may be moved relative to the manufacturing floor in a manufacturing environment.

The base of the manufacturing tool may be moved using jack systems. Conventional jack systems may be undesirably tall. Conventional jack systems may be difficult to integrate into the design of a tool lift or stabilization system. Considerable time may be expended designing the tool lift or stabilization system for each tool. Further, considerable time may be expended designing a tool lift or stabilization system for additional functionalities for a tool.

Sometimes a workpiece may be moved relative to manufacturing tools and the manufacturing floor in the manufacturing environment. Sometimes manufacturing tools may be moved relative to the manufacturing floor in the manufacturing environment. When manufacturing tools move within the manufacturing environment, they may be referred to as mobile manufacturing tools.

Mobile manufacturing tools may have wheels that may move the mobile manufacturing tool in a plurality of directions. These wheels may be referred to as omni-directional wheels. Some conventional examples of omni-directional wheels may include holonomic wheels, omni wheels, or mecanum wheels. However, conventional omni-directional wheels may have an undesirable height. Further, conventional omni-directional wheels may have undesirable surface loading. High surface loading can cause damage to the surface that it rolls across. Additionally, the rollers of conventional omni-directional wheels are contoured, which may cause building conventional omni-directional wheels to be undesirably complex. Further, wheel frames for conventional omni-directional wheels may require a 5 axis milling machine to construct.

Therefore, it would be desirable to have a method and apparatus that take into account at least some of the issues discussed above, as well as other possible issues. Specifically, one issue is to find a method and apparatus for changing the height of a manufacturing tool that may be integrated into a manufacturing tool base. Further, another issue is to find a method and apparatus for moving a mobile manufacturing tool in a plurality of directions.

SUMMARY

An illustrative embodiment of the present disclosure provides a wheel assembly. The wheel assembly comprises a wheel plate and rollers. The wheel plate has a perimeter and an axis of rotation that may be tiltable about a tilt axis. The rollers may be arranged near the perimeter of the wheel plate, each of the rollers having an axis of rotation parallel to the tilt axis.

Another illustrative embodiment of the present disclosure provides a wheel assembly. The wheel assembly comprises a wheel plate, rollers, and a number of bearings. The wheel plate has an axis of rotation and may be positioned in a plane. The rollers may be connected to the wheel plate. Each of the rollers has a central axis parallel to the plane. The number of bearings may be associated with the rollers such that the rollers may spin about a second axis relative to the wheel plate. Each central axis of the rollers remains parallel to each other central axis of the rollers.

A further illustrative embodiment of the present disclosure provides a wheel assembly. The wheel assembly comprises a mounting frame, a wheel plate, a lift, rollers, and a clocking plate. The mounting frame may be connected to a base by a horizontal pivot point. The wheel plate may be rotatable about a main bearing connected to the mounting frame. The wheel plate may have an axis of rotation that may be tiltable about a tilt axis through the horizontal pivot point. The lift may tilt the wheel plate about the tilt axis. The rollers may be connected to the wheel plate using a number of bearings. Each of the rollers may have an axis of rotation parallel to the tilt axis. Each roller of the rollers may be spinnable about the number of bearings. The clocking plate that maintains each central axis of the rollers parallel to each other central axis of the rollers.

A yet further illustrative embodiment of the present disclosure provides a method of moving a device on wheel assemblies in a direction. The method comprises tilting axes of rotation of wheel plates of the wheel assemblies about a tilt axis. The wheel plates may each have a perimeter. The wheel plates may each be associated with respective rollers arranged near the perimeter. Each of the rollers may have an axis of rotation parallel to the tilt axis. The method may also comprise contacting a manufacturing floor with a number of rollers of the rollers of each wheel assembly. The method may further comprise rotating a number of the wheel plates about a respective axis of rotation to move the device in the direction.

An illustrative embodiment of the present disclosure provides an apparatus. The apparatus comprises an upper frame, a lower frame associated with the upper frame, a wedge slideably located between the upper frame and the lower frame, and a force applicator associated with the wedge.

Another illustrative embodiment of the present disclosure provides an apparatus. The apparatus comprises an upper frame, a lower frame, a bias system, an upper air bearing, a lower air bearing, a foot, a wedge, and a force applicator. The bias system may be connected to the upper frame and the lower frame. The bias system may bias the upper frame and the lower frame towards each other. The upper air bearing may be coupled to the upper frame. The lower air bearing may be coupled to the lower frame. The foot may be associated with the lower frame. The wedge may be slideably located between the upper air bearing and the lower air bearing. The force applicator may be associated with the wedge.

A yet further embodiment of the present disclosure provides a method. The method comprises determining a desired height for an apparatus. The apparatus may comprise an upper frame, a lower frame associated with the upper frame, a wedge slideably located between the upper frame and the lower frame, and a force applicator associated with the wedge. The method may further comprise applying force to the wedge using the force applicator to slide the wedge between the upper frame and the lower frame such that the apparatus increases in height to the desired height.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
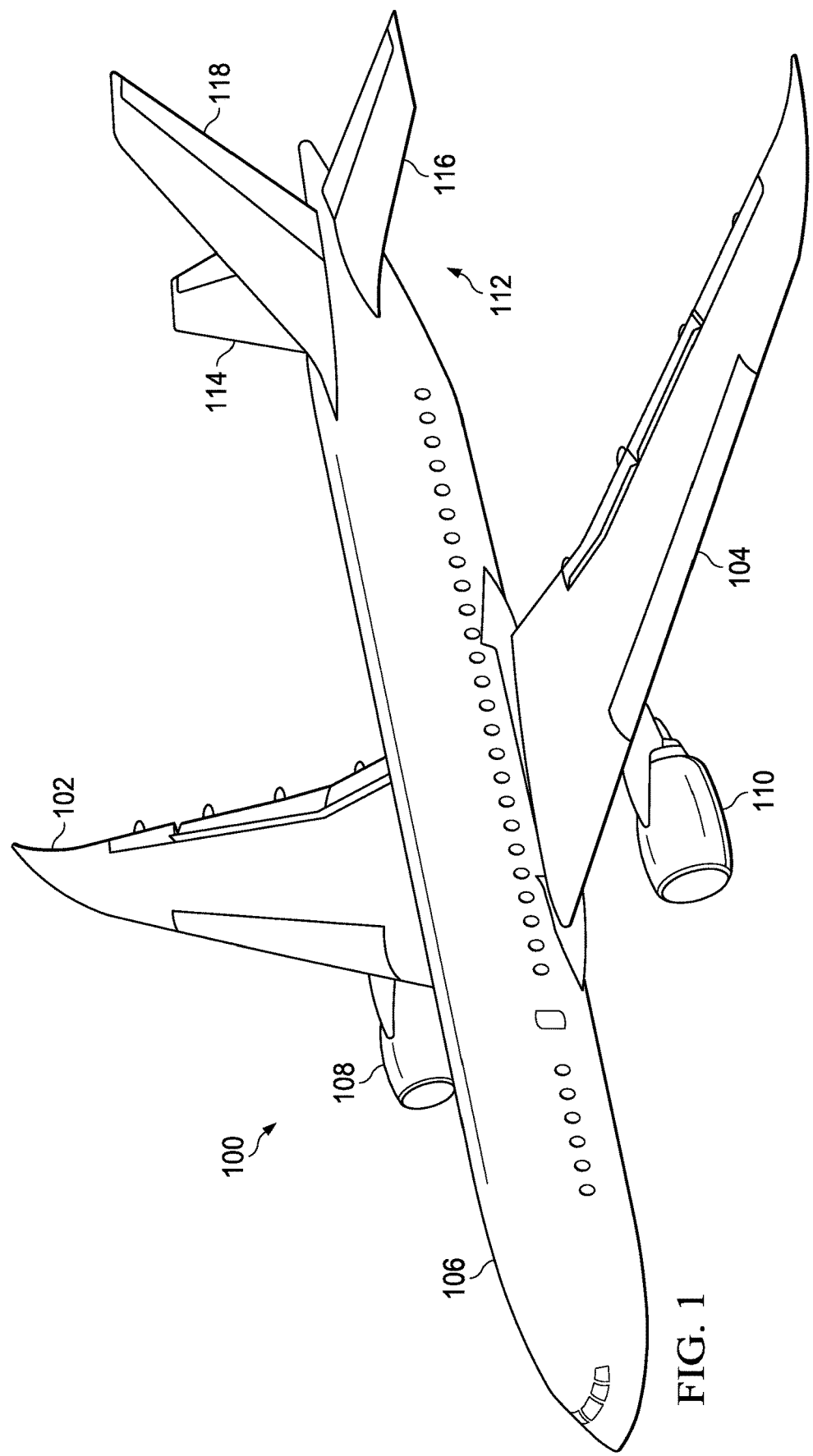
FIG. 1 is an illustration of an aircraft in which an illustrative embodiment may be implemented.

The illustrative embodiments recognize and take into account one or more different considerations. The different illustrative embodiments recognize and take into account that automated mobile manufacturing tools may have a stable platform to rest on. The different illustrative embodiments recognize and take into account that a platform may have only three points of contact on a manufacturing floor. However, the different illustrative embodiments recognize and take into account that only three points of contact on a manufacturing floor may not provide a desirable amount of at least one of stability, safety, or deflection for a manufacturing tool.

The different illustrative embodiments also recognize and take into account that a conventional omni-directional wheel, such as a mecanum wheel, a holonomic wheel, or an omni wheel, may have thousands of pounds per square inch surface loading as it moves. The different illustrative embodiments recognize and take into account that decreasing the surface loading may be accomplished by increasing a surface area of an omni-directional wheel contacting the manufacturing floor. Accordingly, the different illustrative embodiments further recognize and take into account that to decrease the surface loading, a larger omni-directional wheel may be introduced. A larger omni-directional wheel may have a greater overall diameter. A larger omni-directional wheel may have a greater diameter for each roller. A larger omni-directional wheel may have decreased roller diameters but more rollers around the perimeter. Further, the different illustrative embodiments recognize and take into account that to decrease the surface loading, a larger number of omni-directional wheels may be introduced. However, the different illustrative embodiments recognize and take into account that increasing the diameter of the omni-directional wheel may undesirably increase the height of the omni-directional wheel. The different illustrative embodiments recognize and take into account that increasing the height of the omni-directional wheel may raise the center of rotation of the perimeter of the omni-directional wheel which may raise the platform. Additionally, increasing the size of the omni-directional wheel may undesirably increase the cost of manufacturing the omni-directional wheel. Further, the different illustrative embodiments recognize and take into account that increasing the number of omni-directional wheels may undesirably increase the cost of the manufacturing tool. Further, increasing the number of omni-directional wheels may undesirably decrease the space available for attaching other components to the manufacturing tool.

The different illustrative embodiments recognize and take into account that vertical space may be valuable for manufacturing tools. For example, manufacturing tools may be desirably within reach of human operators. Further, vertical space may be used to attach other components to the manufacturing tool. Yet further, increasing the height of a manufacturing tool may make it more difficult to drive under overhanging structures such as wings, stabilizers, or other overhanging structures as the platform will be sitting relatively high above the manufacturing floor.

The different illustrative embodiments recognize and take into account that increasing at least one of design or manufacturing time may increase manufacturing cost. Further, the different illustrative embodiments recognize and take into account that forming conical wheels of conventional omni-directional wheels may take at least one of an undesirable amount of manufacturing time or cost. Yet further, the different illustrative embodiments recognize and take into account that incorporating traditional jacks to a tool base may take a considerable amount of design time for each tool. Thus, the illustrative embodiments present methods and apparatuses including a wheel assembly and a wedge jack which take into account at least one of the above considerations.

With reference now to the figures, and in particular, with reference to FIG. 1, an illustration of an aircraft is depicted in which an illustrative embodiment may be implemented. In this illustrative example, aircraft 100 may have wing 102 and wing 104 attached to body 106. Aircraft 100 includes engine 108 attached to wing 102 and engine 110 attached to wing 104.

Body 106 may have tail section 112. Horizontal stabilizer 114, horizontal stabilizer 116, and vertical stabilizer 118 may be attached to tail section 112 of body 106.

Aircraft 100 is an example of an aircraft which may be manufactured using positioning systems in accordance with an illustrative embodiment. For example, a component of aircraft 100 may assembled using manufacturing equipment associated with at least one of a wheel assembly or a wedge jack.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, and other suitable types of aircraft. Further, FIG. 27 below provides a functional block diagram of an aircraft such as aircraft 100 of FIG. 1.

Figure 2:
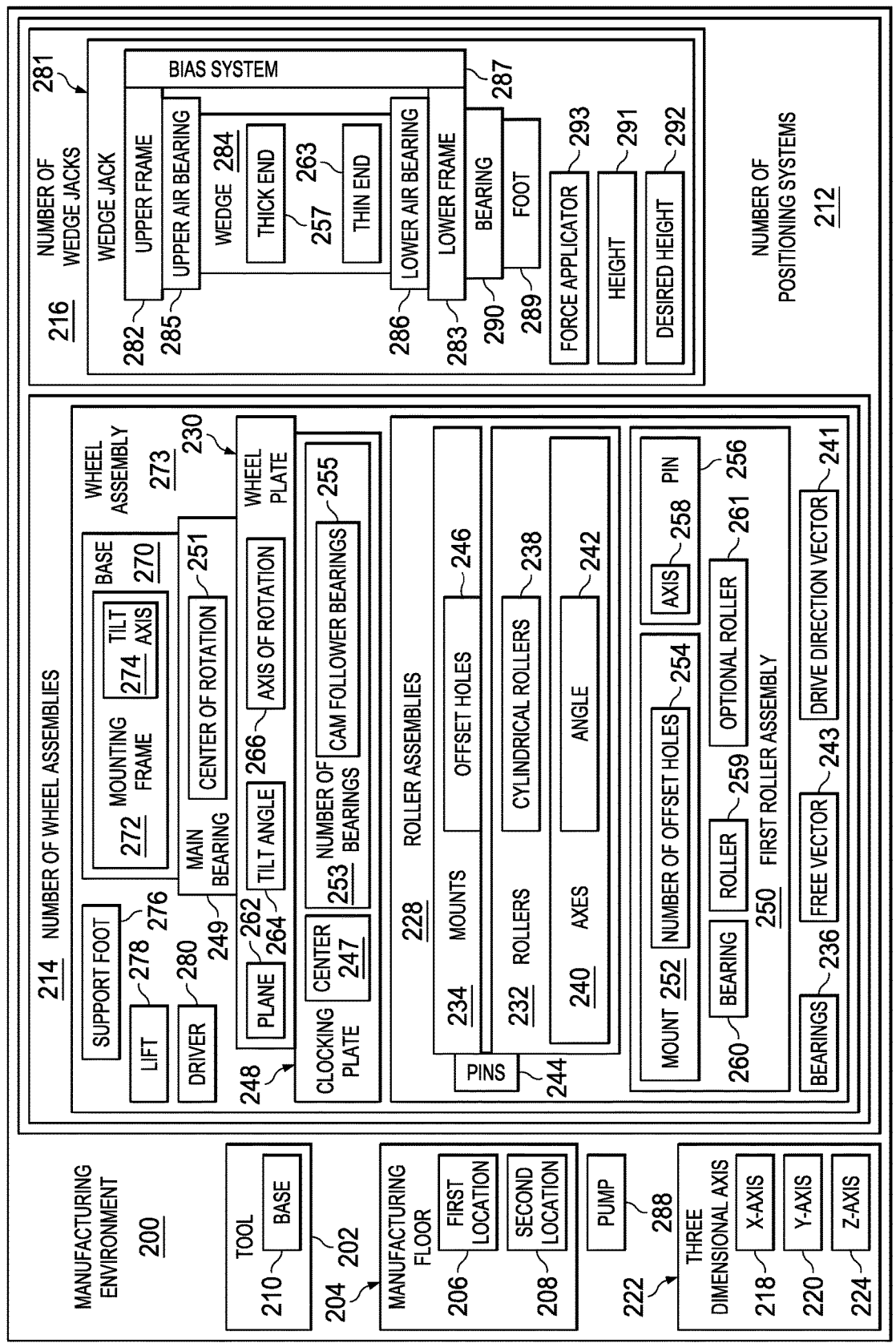
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Components of aircraft 100 of FIG. 1 may be manufactured in manufacturing environment 200.

Manufacturing environment 200 may be an environment in which a manufacturing tool may be moved and positioned. For example, manufacturing environment 200 may be an environment in which tool 202 may be positioned on manufacturing floor 204. In one example, tool 202 may be positioned on manufacturing floor 204 by moving tool 202 from first location 206 to second location 208 on manufacturing floor 204. As another example, tool 202 may be positioned on manufacturing floor 204 by increasing the height of tool 202. Increasing the height of tool 202 may move tool 202 relative to manufacturing floor 204.

Tool 202 may be moved on manufacturing floor 204 from first location 206 to second location 208 by moving base 210 of tool 202 from first location 206 to second location 208. Tool 202 may be increased in height by moving base 210 away from manufacturing floor 204. Moving base 210 away from manufacturing floor 204 increases the vertical distance between base 210 and manufacturing floor 204.

Tool 202 may be moved using number of positioning systems 212. Number of positioning systems 212 may include number of wheel assemblies 214 and number of wedge jacks 216. Number of wheel assemblies 214 may be used to move base 210 of tool 202 relative to manufacturing floor 204. Number of wheel assemblies 214 may be used to move base 210 of tool 202 from first location 206 to second location 208. Number of wheel assemblies 214 may be used to move base 210 of tool 202 within at least one of x-axis 218 and y-axis 220 of three dimensional axis 222 relative to manufacturing floor 204.

As used herein, the phrase "at least one of," when used with a list of items, means different combinations of one or more of the listed items may be used and only one of each item in the aist may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination of items and number of items may be used from the list but not all of the items in the list are required.

Number of wedge jacks 216 may be used to increase height of tool 202. Number of wedge jacks 216 may be used to move tool 202 relative to manufacturing floor 204. Number of wedge jacks 216 may be used to move base 210 of tool 202 relative to manufacturing floor 204. Number of wedge jacks 216 may be used to move base 210 of tool 202 in z-axis 224 of three dimensional axis 222 relative to manufacturing floor 204.

Number of wheel assemblies 214 may include roller assemblies 228 associated with wheel plate 230. Roller assemblies 228 may include rollers 232, mounts 234, and bearings 236. Rollers 232 may be cylindrical rollers 238. In some illustrative examples, rollers 232 may have a shape selected from at least one of a substantially cylindrical shape, a substantially oval shape, a wedge-like shape, a tapered cylindrical shape, or other desirable shape. Rollers 232 may be formed of a material selected to withstand desired loads. In some illustrative examples, rollers 232 may be formed of at least one of a polymeric material, a metal, an alloy, or other desirable material. In some illustrative examples, rollers 232 may include an elastomeric material such as a urethane or a rubber. In some illustrative examples, rollers 232 may be formed of more than one material. In some illustrative examples, rollers 232 may be formed of a core and an outer layer. In these illustrative examples, the outer layer may be a softer material than the core. In other illustrative examples, rollers 232 may be unitary components formed of a combination of one or more materials.

Rollers 232 have axes 240 which may all have angle 242 relative to wheel plate 230. Each of axes 240 may be referred to as a center axis or an axis of rotation of a respective roller of rollers 232. Angle 242 may be the same for each of axes 240. Rollers 232 may be connected to mounts 234 via pins 244. Pins 244 may run along axes 240. Axes 240 may be parallel to drive direction vector 241. Axes 240 may be perpendicular to free vector 243. A free vector may be a direction in which a payload such as tool 202 may freely move on a roller assembly of roller assemblies 228. As axes 240 may all have the same angle 242, roller assemblies 228 may all have the same free vector.

Mounts 234 may each have an offset hole of offset holes 246. Bearings 236 may be associated with mounts 234 and wheel plate 230. Bearings 236 may facilitate rotation of mounts 234 relative to wheel plate 230.

Clocking plate 248 may be associated with offset holes 246 of mounts 234. Clocking plate 248 may facilitate rotation of mounts 234 relative to wheel plate 230. Clocking plate 248 may rotate about a center that is offset from the center of rotation of main bearing 249. Clocking plate 248 may rotate about center 247 that is offset from center of rotation 251 of main bearing 249 by an offset equal to the offset of offset holes 246 of mounts 234 of roller assemblies 228. Clocking plate 248 may be held to rotation about center 247 by number of bearings 253. In some illustrative examples, number of bearings 253 may include at least three cam follower bearings 255.

First roller assembly 250 may be a roller assembly in roller assemblies 228. First roller assembly 250 may include mount 252 having number of offset holes 254, pin 256 having axis 258, roller 259, and bearing 260. In some illustrative examples, first roller assembly 250 may also include optional roller 261. In these illustrative examples, mount 252 of first roller assembly 250 may be referred to as a center stake mount. In these illustrative examples, a portion of mount 252 may be positioned between roller 259 and optional roller 261. In some illustrative examples, each of roller assemblies 228 may be associated with a single roller of rollers 232. In other illustrative examples, some of roller assemblies 228 may be associated with more than one roller of rollers 232. In one illustrative example, each of roller assemblies 228 may be associated with two rollers of rollers 232. First roller assembly 250 and the remainder of roller assemblies 228 may be associated with wheel plate 230.

Wheel plate 230 may have plane 262, tilt angle 264, and axis of rotation 266. Wheel plate 230 may be substantially planar. Plane 262 may run substantially through wheel plate 230. Axis of rotation 266 may be substantially perpendicular to plane 262. Wheel plate 230 may rotate about axis of rotation 266. Main bearing 249 may facilitate rotation of wheel plate 230 relative to base 270 and mounting frame 272.

Base 270 may connect wheel assembly 273 to base 210 of tool 202. Base 270 of wheel assembly 273 may be connected to base 210 of tool 202. As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Mounting frame 272 may be attached to main bearing 249. Roller assemblies 228, wheel plate 230, and clocking plate 248 may be associated with mounting frame 272 through at least main bearing 249.

Mounting frame 272 is tiltably connected to base 270 through tilt axis 274. Mounting frame 272 may tilt relative to base 270 about tilt axis 274. Wheel plate 230 is moveably connected to mounting frame 272. When mounting frame 272 tilts relative to tilt axis 274, wheel plate 230 may have tilt angle 264 relative to base 270. Tilt angle 264 may be changed to allow a number of rollers 232 to contact manufacturing floor 204. Further, tilt angle 264 may be adjusted to change the number of rollers 232 contacting manufacturing floor 204. Yet further, tilt angle 264 may be changed to allow tool 202 to rest on support foot 276 of wheel assembly 273.

Tilt angle 264 may be changed using lift 278. Lift 278 may be a mechanical, pneumatic, hydraulic, or other desirable form of lift. Lift 278 may be associated with mounting frame 272. Lift 278 may be activated to move mounting frame 272 about tilt axis 274.

Driver 280 may be used to drive motion of at least one of wheel plate 230, clocking plate 248, and roller assemblies 228. In some illustrative examples, driver 280 may be used to drive motion of wheel plate 230 to move tool 202 relative to manufacturing floor 204.

Driver 280 may take the form of a vertically mounted drive shaft. Driver 280 may be directly or indirectly connected to wheel plate 230 to drive motion of wheel plate 230. Driver 280 may be associated with at least one of a gear, a cog, or other desirable component. In some illustrative examples, a gear associated with driver 280 may directly interface with wheel plate 230 to drive motion of wheel plate 230. In some illustrative examples, a gear associated with driver 280 may indirectly interface with wheel plate 230. For example, a gear associated with driver 280 may interface with a chain, cog belt, flexible rack, or other desirable component. The chain, cog belt, flexible rack, or other desirable component may interface with wheel plate 230 to drive motion of wheel plate 230.

Number of wedge jacks 216 includes wedge jack 281. Wedge jack 281 includes upper frame 282, lower frame 283, wedge 284, upper air bearing 285, and lower air bearing 286. Wedge 284 may be slideably located between upper frame 282 and lower frame 283. Upper air bearing 285 may be coupled to upper frame 282. Lower air bearing 286 may be coupled to lower frame 283. Upper air bearing 285 and lower air bearing 286 may be formed of a material selected to provide sufficient friction to maintain a position of wedge 284 relative to upper frame 282 and lower frame 283.

Bias system 287 may be connected to upper frame 282 and lower frame 283. Bias system 287 may bias upper frame 282 and lower frame 283 towards each other. In some illustrative examples, bias system 287 may include a spring. At least one of upper air bearing 285 and lower air bearing 286 may be connected to pump 288. When upper air bearing 285 is activated, friction between wedge 284 and upper air bearing 285 may be reduced. Air from upper air bearing 285 may act as a lubricant for movement of wedge 284. When lower air bearing 286 is activated, friction between wedge 284 and lower air bearing 286 may be reduced. Air from lower air bearing 286 may act as a lubricant for movement of wedge 284. In some illustrative examples, when upper air bearing 285 is activated, the interface between upper air bearing 285 and wedge 284 may be nearly frictionless. In some illustrative examples, when lower air bearing 286 is activated, the interface between lower air bearing 286 and wedge 284 may be nearly frictionless.

Upper frame 282 may be connected to base 210 of tool 202. Lower frame 283 may be associated with foot 289. Foot 289 may contact manufacturing floor 204. Bearing 290 may be positioned between foot 289 and lower frame 283 such that foot 289 is substantially parallel with manufacturing floor 204.

Wedge jack 281 may have height 291. Wedge jack 281 may have desired height 292. When height 291 is different from desired height 292, wedge 284 may be moved along one of x-axis 218 and y-axis 220 using force applicator 293. Force applicator 293 may apply force to wedge 284 to move wedge 284 relative to upper frame 282 and lower frame 283. Force applicator 293 may be associated with at least one of a pneumatic force, a hydraulic force, an electro-mechanical force, or a mechanical force. Force applicator 293 may take the form of at least one of a pneumatic cylinder, hydraulic cylinder, ball screw drive, or any other desirable force applicator.

Wedge 284 may be a triangular shaped tool. Wedge 284 may include a number of inclined planes such that wedge 284 tapers from thick end 257 to thin end 263. Wedge 284 may convert a force applied to one of thick end 257 and thin end 263 by force applicator 293 into forces perpendicular to its inclined surfaces. The mechanical advantage of wedge 284 may be given by the ratio of the length of its slope to its width. Giving wedge 284 a shorter length and a wider angle may require more force from force applicator 293 to move than giving wedge a longer length and a narrower angle.

Moving wedge 284 relative to upper frame 282 and lower frame 283 may change the distance between upper frame 282 and lower frame 283. Wedge 284 may be moved to increase the distance between upper frame 282 and lower frame 283. Wedge 284 may be moved to decrease the distance between upper frame 282 and lower frame 283. For example, by increasing a distance between upper frame 282 and lower frame 283, height 291 may be increased. As another example, by decreasing a distance between upper frame 282 and lower frame 283, height 291 may be decreased.

Height 291 may be decreased to allow tool 202 to rest on a number of supports other than wedge jack 281. For example, by decreasing height 291, tool 202 may rest on at least one of feet, wheels, or other desirable supports other than wedge jack 281. Decreasing height 291 may shift the weight of tool 202 from wedge jack 281 to feet, wheels, or other supports. By increasing height 291, the weight of tool 202 may be shifted from a number of other supports to wedge jack 281.

Figure 3:
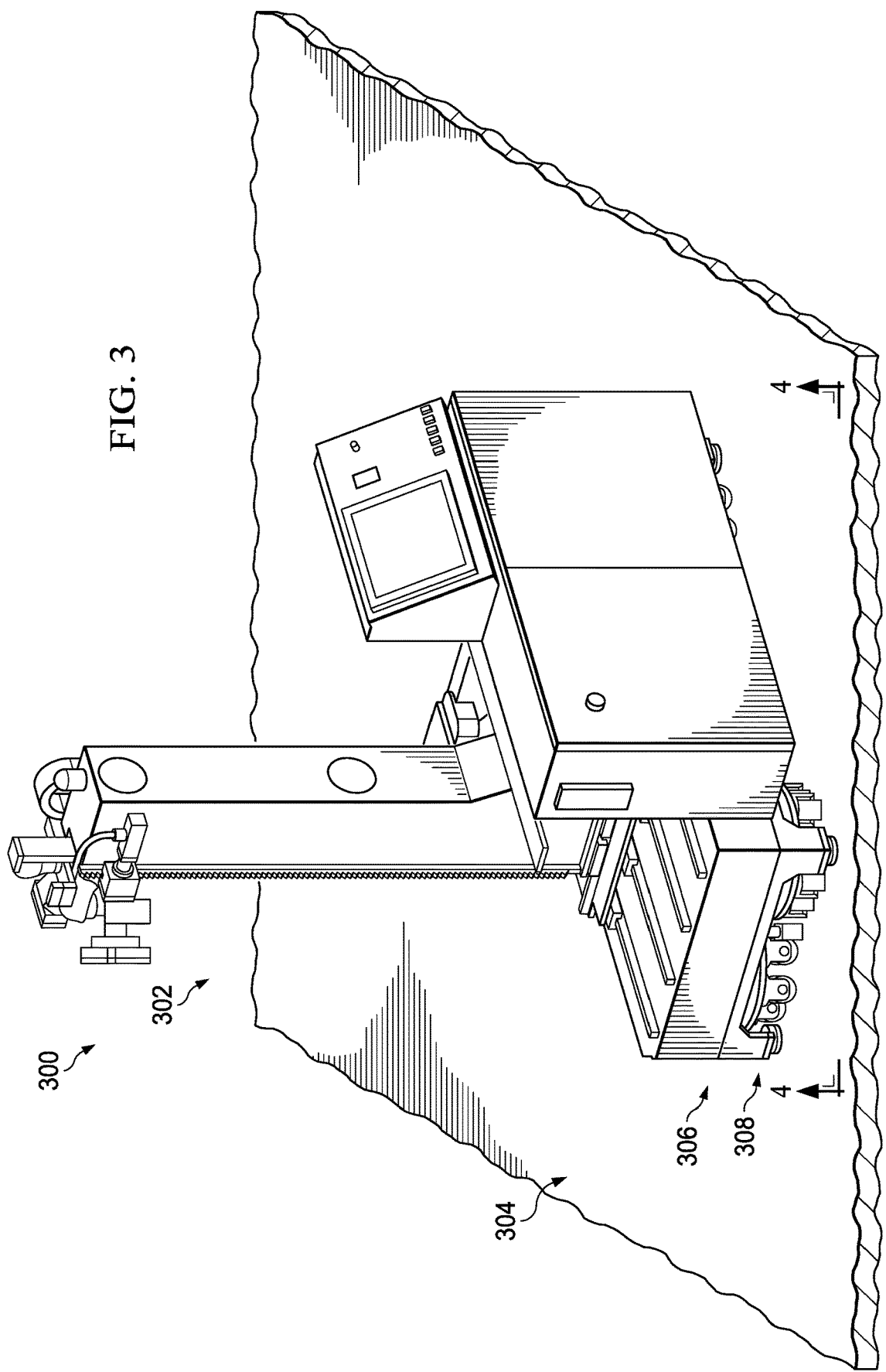
FIG. 3 is an illustration of an isometric view of a tool in a manufacturing environment in accordance with an illustrative embodiment.

Turning now to FIG. 3, an illustration of an isometric view of a tool in a manufacturing environment is depicted in accordance with an illustrative embodiment. Manufacturing environment 300 may be a physical embodiment of manufacturing environment 200 of FIG. 2. Manufacturing environment 300 may have tool 302 on manufacturing floor 304. Tool 302 may have base 306 with number of wheel assemblies 308.

Figure 4:
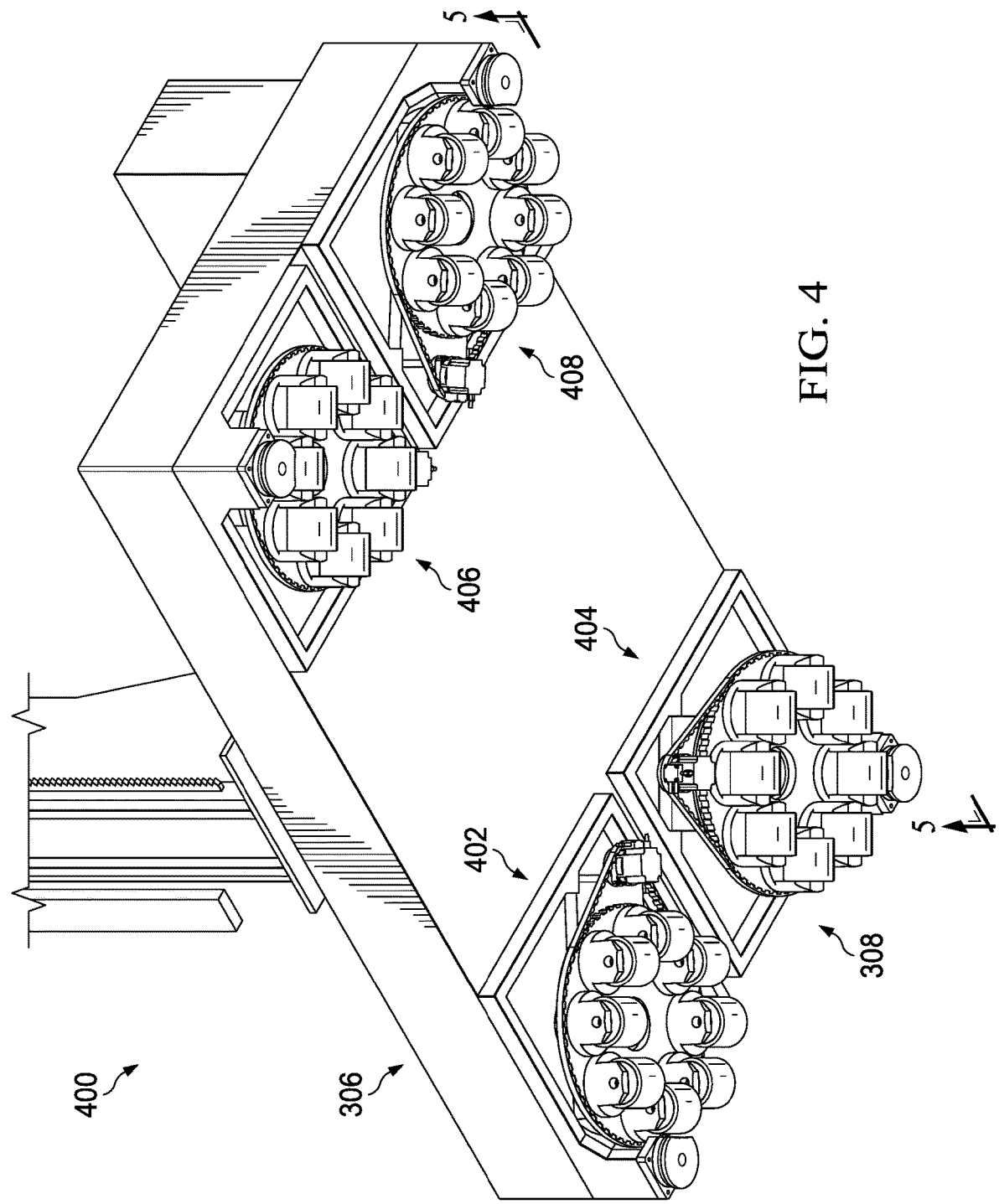
FIG. 4 is an illustration of a bottom isometric view of a tool in a manufacturing environment in accordance with an illustrative embodiment.

Turning now to FIG. 4, an illustration of a bottom isometric view of a tool in a manufacturing environment is depicted in accordance with an illustrative embodiment. View 400 is a view of tool 302 from direction 4-4 of FIG. 3. In view 400, wheel assembly 402, wheel assembly 404, wheel assembly 406, and wheel assembly 408 of number of wheel assemblies 308 can be seen. Each of number of wheel assemblies 308 may include a respective number of rollers. The rollers may be cylindrical rollers.

Although number of wheel assemblies 308 includes four wheel assemblies, number of wheel assemblies 308 may include any desirable number of wheel assemblies. The quantity of wheel assemblies may be selected based on at least one of a desired number of contacts with the manufacturing floor for stability of tool 302, a desired floor loading, a desired load for each roller contacting the manufacturing floor, the drive direction vector of each of number of wheel assemblies 308, or other desirable factors.

Further, other optional components may be associated with base 306 which are not depicted. In some illustrative examples, a number of caster wheels may be associated with base 306 of tool 302. The number of caster wheels may be used to support tool 302. The number of caster wheels may freely spin. The number of caster wheels may not be power driven.

Figure 5:
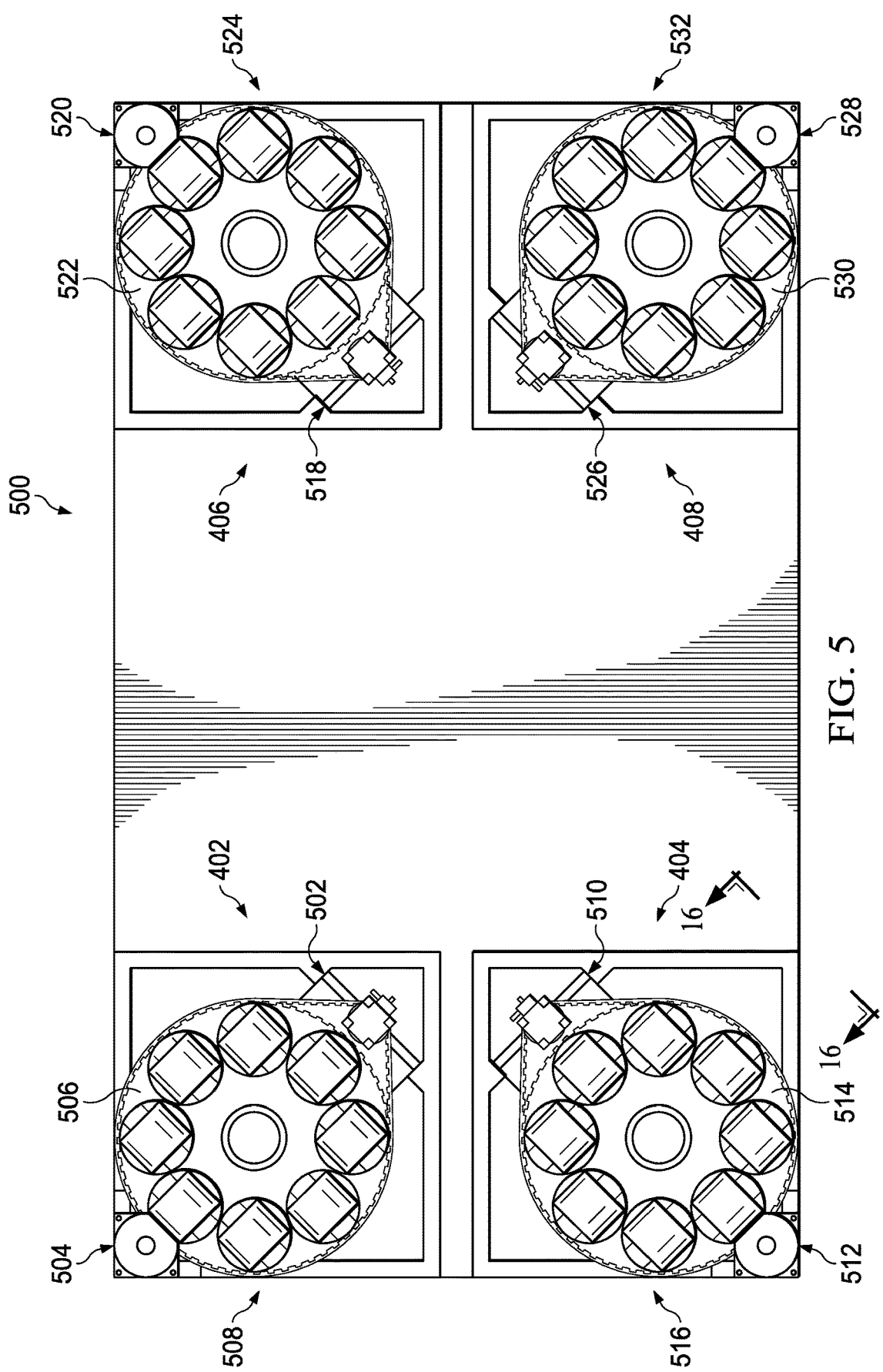
FIG. 5 is an illustration of a bottom view of a tool using a number of wheel assemblies in accordance with an illustrative embodiment.

Turning now to FIG. 5, an illustration of a bottom view of a tool using a number of wheel assemblies is depicted in accordance with an illustrative embodiment. View 500 may be a bottom view of tool 302 as shown in FIG. 3. Specifically, view 500 may be a view of base 306 and number of wheel assemblies 308 from direction 5-5 of FIG. 4.

As can be seen in view 500, each of number of wheel assemblies 308 may have a respective tilt axis, support foot, wheel plate, and rollers. For example, wheel assembly 402 may have tilt axis 502, support foot 504, wheel plate 506, and rollers 508. Wheel assembly 404 may have tilt axis 510, support foot 512, wheel plate 514, and rollers 516. Wheel assembly 406 may have tilt axis 518, support foot 520, wheel plate 522, and rollers 524. Wheel assembly 408 may have tilt axis 526, support foot 528, wheel plate 530, and rollers 532.

Tool 302 may rest on support foot 504, support foot 512, support foot 520, and support foot 528 when base 306 is not moving relative to a manufacturing floor. When tool 302, including base 306, is to be moved relative to a manufacturing floor, wheel plate 506 may be tilted about tilt axis 502. Tilting wheel plate 506 about tilt axis 502 may cause a number of rollers 508 to contact a manufacturing floor. When tool 302, including base 306, is to be moved relative to a manufacturing floor 304, wheel plate 514 may be tilted about tilt axis 510. Tilting wheel plate 514 about tilt axis 510 may cause a number of rollers 516 to contact a manufacturing floor. When tool 302, including base 306, is to be moved relative to manufacturing floor 304, wheel plate 522 may be tilted about tilt axis 518. Tilting wheel plate 522 about tilt axis 518 may cause a number of rollers 524 to contact manufacturing floor 304. When tool 302, including base 306, is to be moved relative to manufacturing floor 304, wheel plate 530 may be tilted about tilt axis 526. Tilting wheel plate 530 about tilt axis 526 may cause a number of rollers 532 to contact a manufacturing floor.

Figure 6:
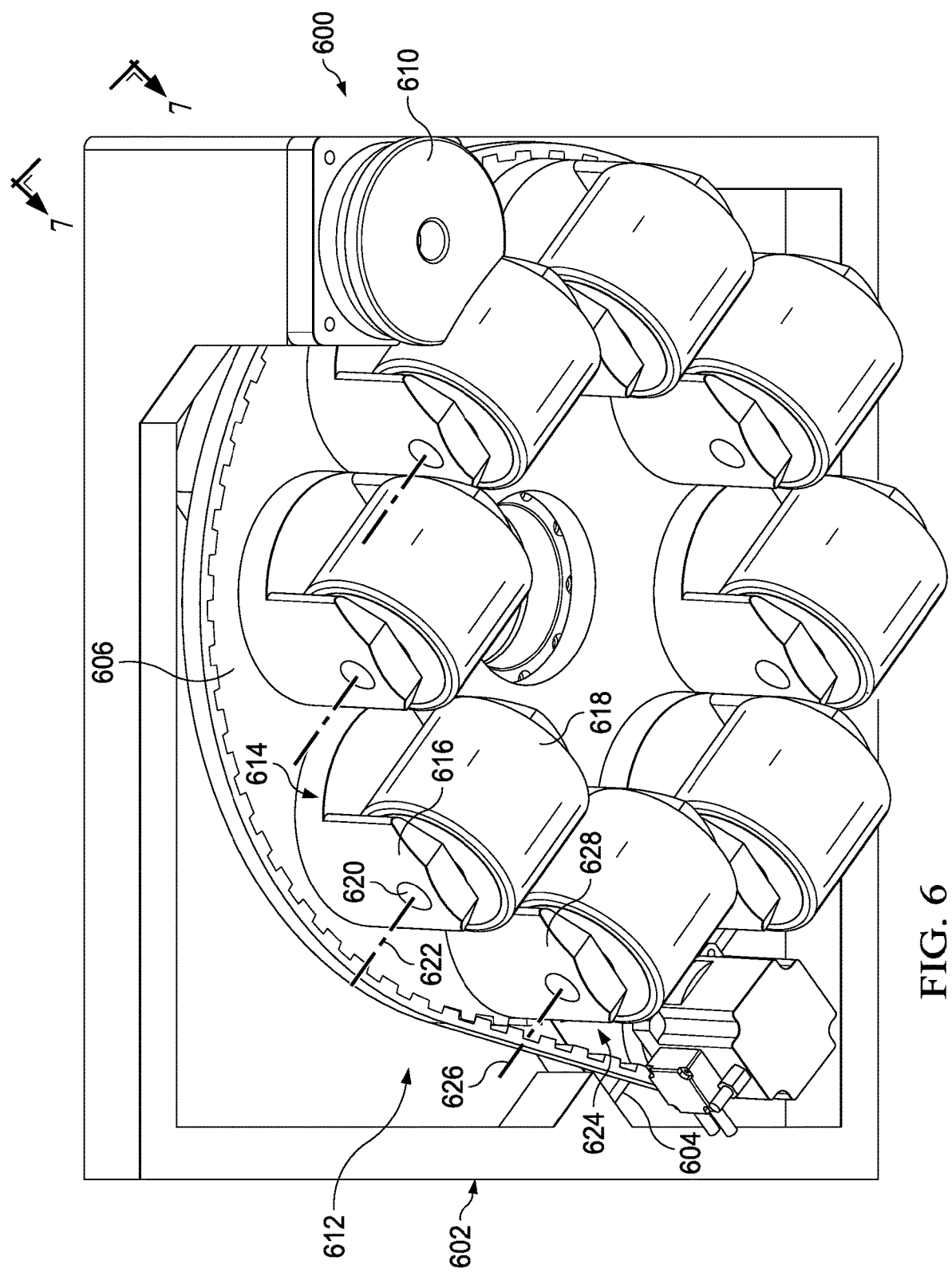
FIG. 6 is an illustration of an isometric view of a wheel assembly in accordance with an illustrative embodiment.

Turning now to FIG. 6, an illustration of an isometric view of a wheel assembly is depicted in accordance with an illustrative embodiment. Wheel assembly 600 may be a physical embodiment of wheel assembly 273 of FIG. 2. Wheel assembly 600 may be one of wheel assembly 402, wheel assembly 404, wheel assembly 406, and wheel assembly 408 of number of wheel assemblies 308 of FIG. 4.

Wheel assembly 600 may have base 602, tilt axis 604, wheel plate 606, driver 608, support foot 610, and roller assemblies 612. Roller assemblies 612 may include first roller assembly 614. First roller assembly 614 may include mount 616, roller 618, and pin 620. Pin 620 may secure roller 618 to mount 616. Axis 622 may run through pin 620. Roller 618 may rotate about axis 622. roller assemblies 612 may also include second roller assembly 624. Second roller assembly 624 may have axis 626 and mount 628. Axis 626 may be parallel to axis 622. As wheel plate 606 rotates, axis 622 and axis 626 may remain parallel to each other. Further, as wheel plate 230 rotates, axis 622 and axis 626 may remain at the same angle relative to tilt axis 604. As depicted, axis 622 and axis 626 may be parallel to tilt axis 604.

Figure 7:
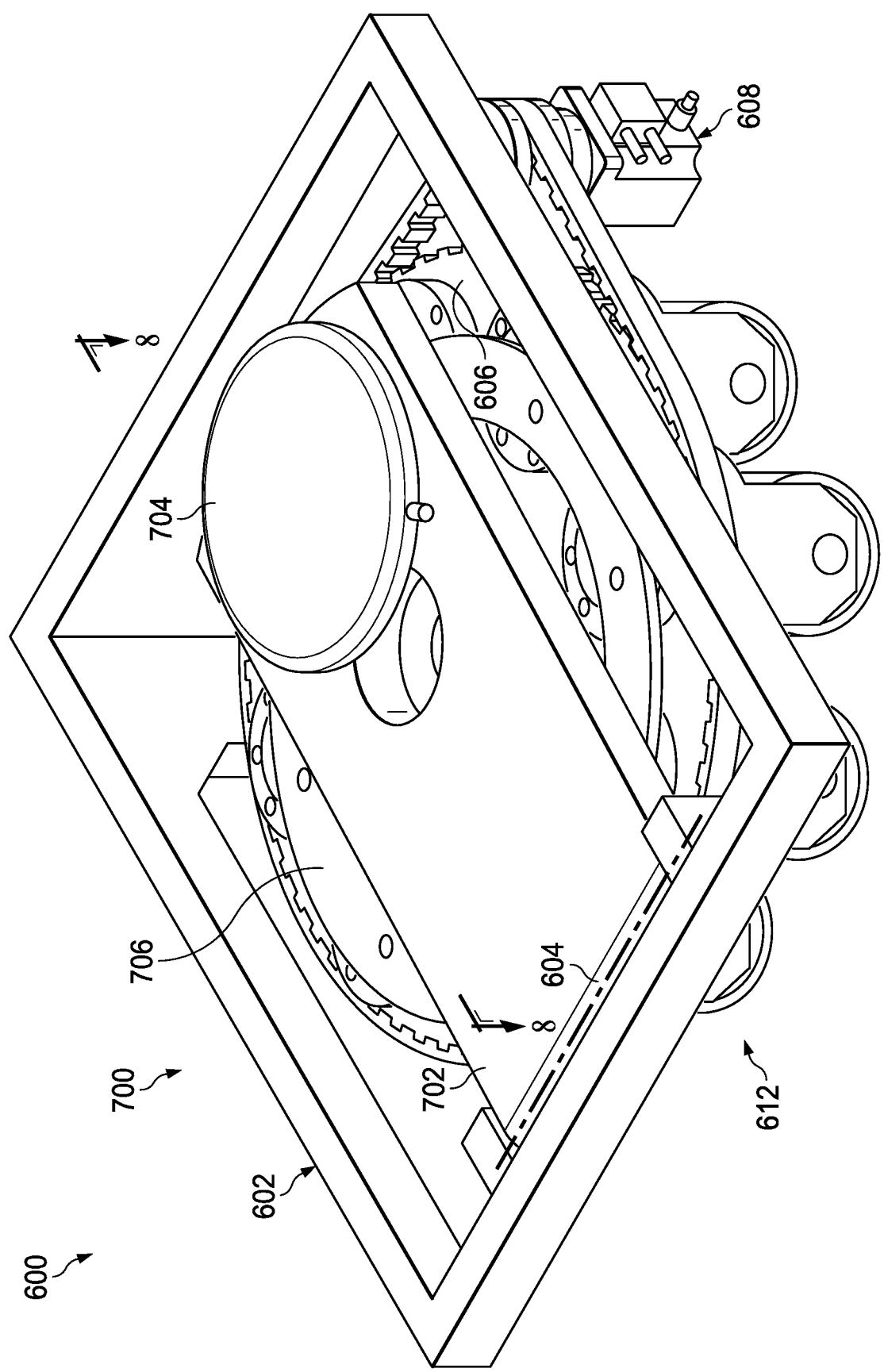
FIG. 7 is an illustration of an isometric view of a wheel assembly in accordance with an illustrative embodiment.

Turning now to FIG. 7, an illustration of an isometric view of a wheel assembly is depicted in accordance with an illustrative embodiment. View 700 is a view of wheel assembly 600 from direction 7-7 of FIG. 6.

Wheel assembly 600 may have mounting plate 702 attached to base 602 at tilt axis 604. Mounting plate 702 may tilt relative to base 602 about tilt axis 604. Lift 704 is associated with mounting plate 702. Lift 704 may be activated to tilt mounting plate 702 relative to base 602. In some illustrative examples, lift 704 may be pneumatic. In other illustrative examples, lift 704 may be mechanical, hydraulic, or some other desirable form of lift. In some illustrative examples, lift 704 may be activated by receiving a command to operate. In some illustrative examples, lift 704 may be activated by receiving power such as electrical, hydraulic, pneumatic, or other type of power.

Clocking plate 706 and wheel plate 606 may be associated with mounting plate 702. As mounting plate 702 tilts relative to base 602, clocking plate 706 and wheel plate 606 also tilt relative to base 602. Lift 704 may be activated to tilt wheel plate 606 such that a number of roller assemblies of roller assemblies 612 may contact a manufacturing floor 304. In some illustrative examples, number of roller assemblies may be three or more roller assemblies. In some illustrative examples, number of roller assemblies may be two roller assemblies. In some illustrative examples, the number of roller assemblies may be one roller assembly. The number of roller assemblies contacting manufacturing floor 304 may change as wheel plate 606 rotates.

Figure 8:
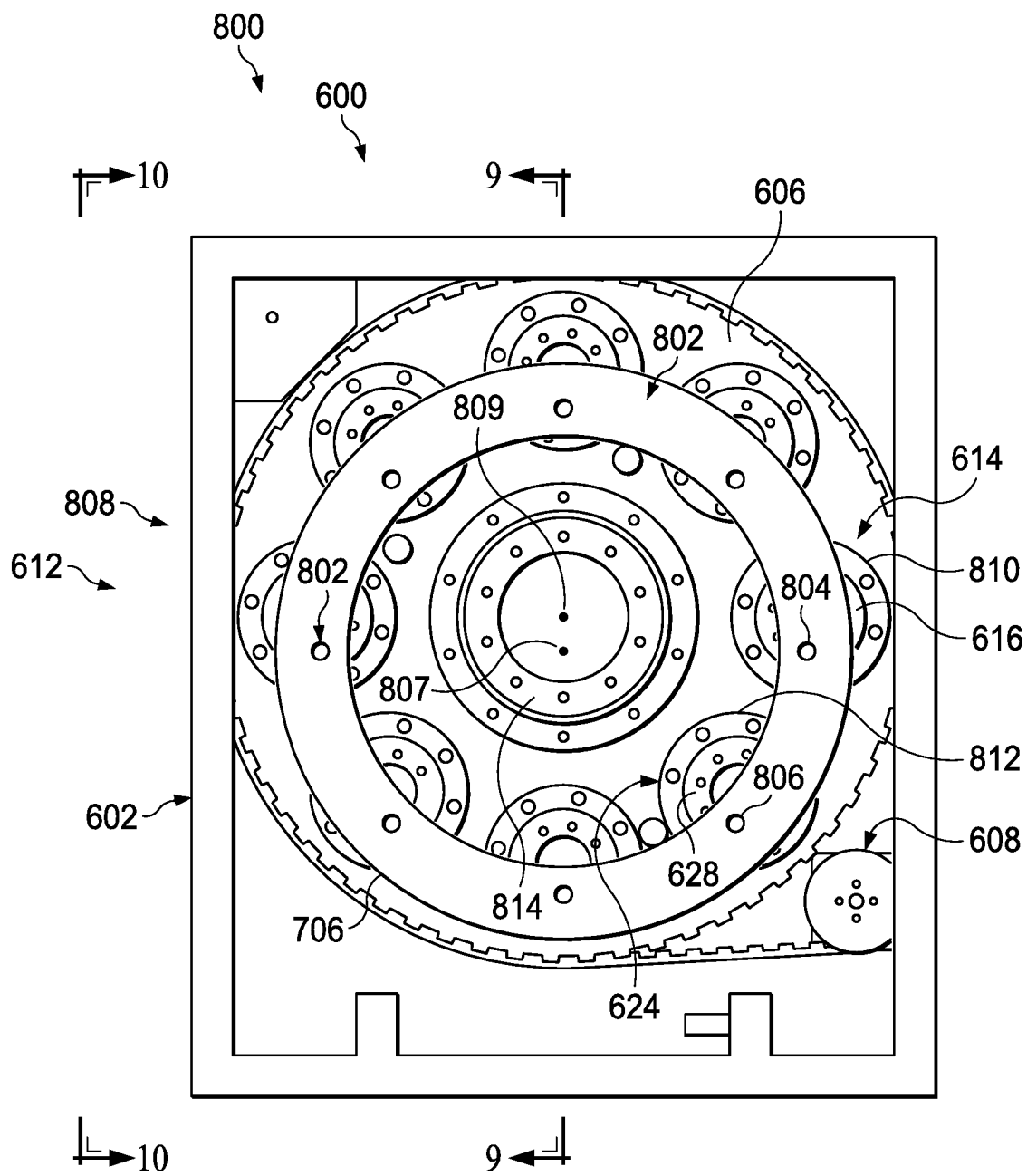
FIG. 8 is an illustration of a top view of a wheel assembly in accordance with an illustrative embodiment.

Turning now to FIG. 8, an illustration of a top view of a wheel assembly is depicted in accordance with an illustrative embodiment. View 800 is a view of wheel assembly 600 from direction 8-8 of FIG. 7 with mounting plate 702 and lift 704 removed for demonstration purposes.

In view 800, clocking plate 706 is more clearly shown. As can be seen from view 800, clocking plate 706 may have number of connection points 802. Each of number of connection points 802 may moveably connect a respective roller assembly of roller assemblies 612 to clocking plate 706. For example, connection point 804 may moveably connect first roller assembly 614 to clocking plate 706. Connection point 806 may moveably connect second roller assembly 624 to clocking plate 706. As can be seen from view 800, the center of rotation 807 of clocking plate 706 is offset from the center of rotation 809 of wheel plate 606. Having the center of rotation 807 of clocking plate 706 offset from the center of rotation 809 of wheel plate 606 may allow for each of roller assemblies 612 to maintain the angle of their axis of rotation relative to driver 608.

Each of roller assemblies 612 may also have a respective bearing of bearings 808. Bearings 808 may facilitate movement of roller assemblies 612 relative to wheel plate 606. First roller assembly 614 may be associated with first bearing 810 of bearings 808. First bearing 810 may facilitate movement of first roller assembly 614 relative to wheel plate 606. For example, first bearing 810 may allow mount 616 to rotate relative to wheel plate 606. Second roller assembly 624 may be associated with second bearing 812 of bearings 808. Second bearing 812 may allow mount 628 of first roller assembly 614 to rotate relative to wheel plate 606.

Wheel plate 606 may be associated with main bearing 814. Main bearing 814 may facilitate rotation of wheel plate 606 relative to base 602.

Figure 9:
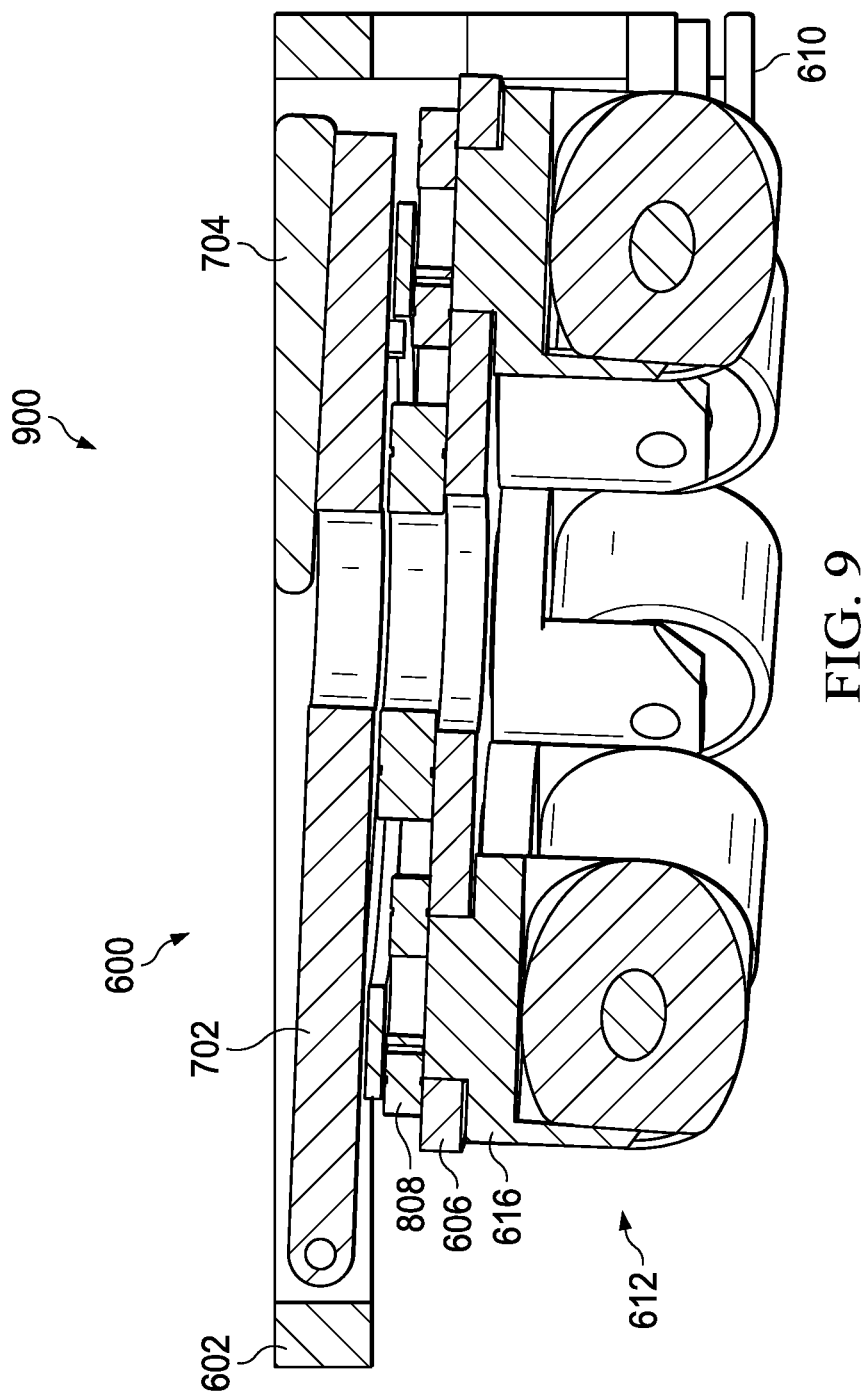
FIG. 9 is an illustration of a cross-sectional view of a wheel assembly in accordance with an illustrative embodiment.

Turning now to FIG. 9, an illustration of a cross-sectional view of a wheel assembly is depicted in accordance with an illustrative embodiment. View 900 is a view of wheel assembly 600 within cross-section 9-9 of FIG. 8.

As can be seen from view 900, as lift 704 expands, mounting plate 702 may tilt relative to base 602. As a result of mounting plate 702 tiling, wheel plate 606 may also tilt relative to base 602.

Figure 10:
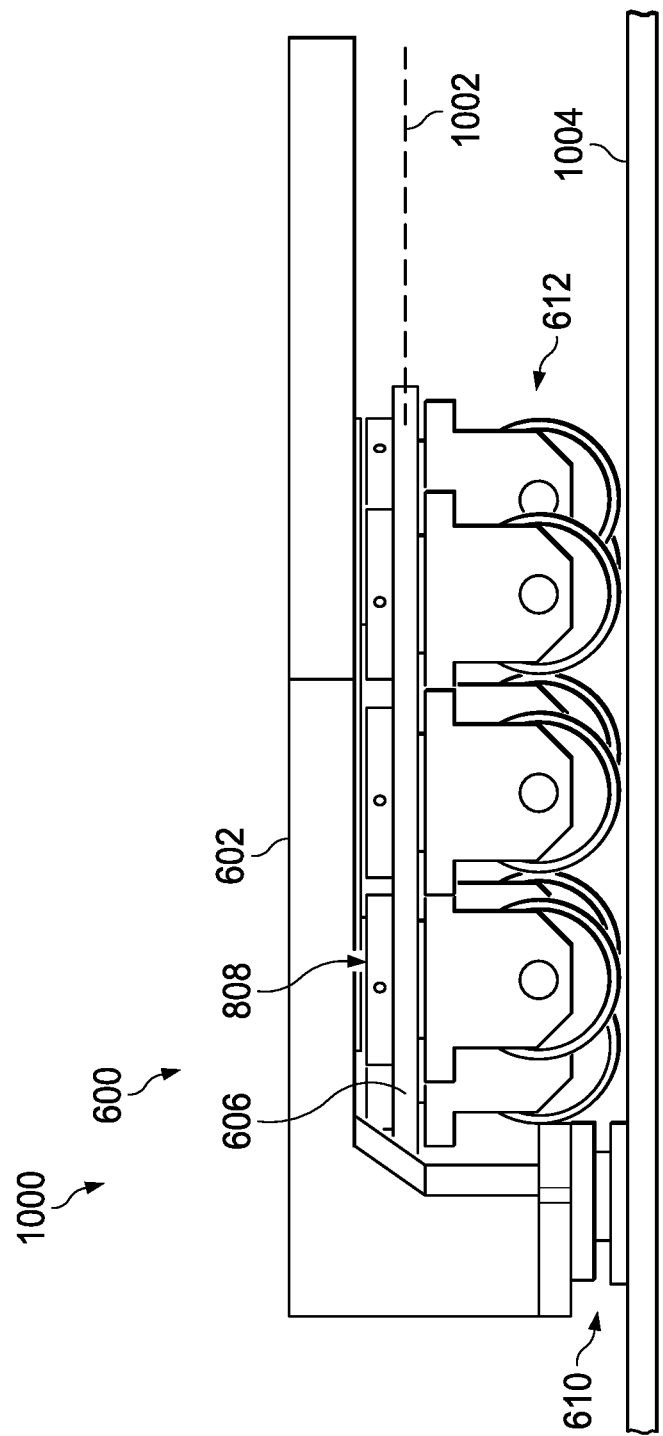
FIG. 10 is an illustration of an side view of a wheel assembly in a first position in accordance with an illustrative embodiment.

Turning now to FIG. 10, an illustration of a side view of a wheel assembly in a first position is depicted in accordance with an illustrative embodiment. View 1000 is a view of wheel assembly 600 from direction 10-10 of FIG. 8.

In view 1000, plane 1002 of wheel plate 606 is substantially parallel to manufacturing floor 1004. Plane 1002 runs through wheel plate 606. As plane 1002 is substantially parallel to manufacturing floor 1004, roller assemblies 612 do not contact manufacturing floor 1004. As plane 1002 is substantially parallel to manufacturing floor 1004, support foot 610 contacts manufacturing floor 1004.

Figure 11:
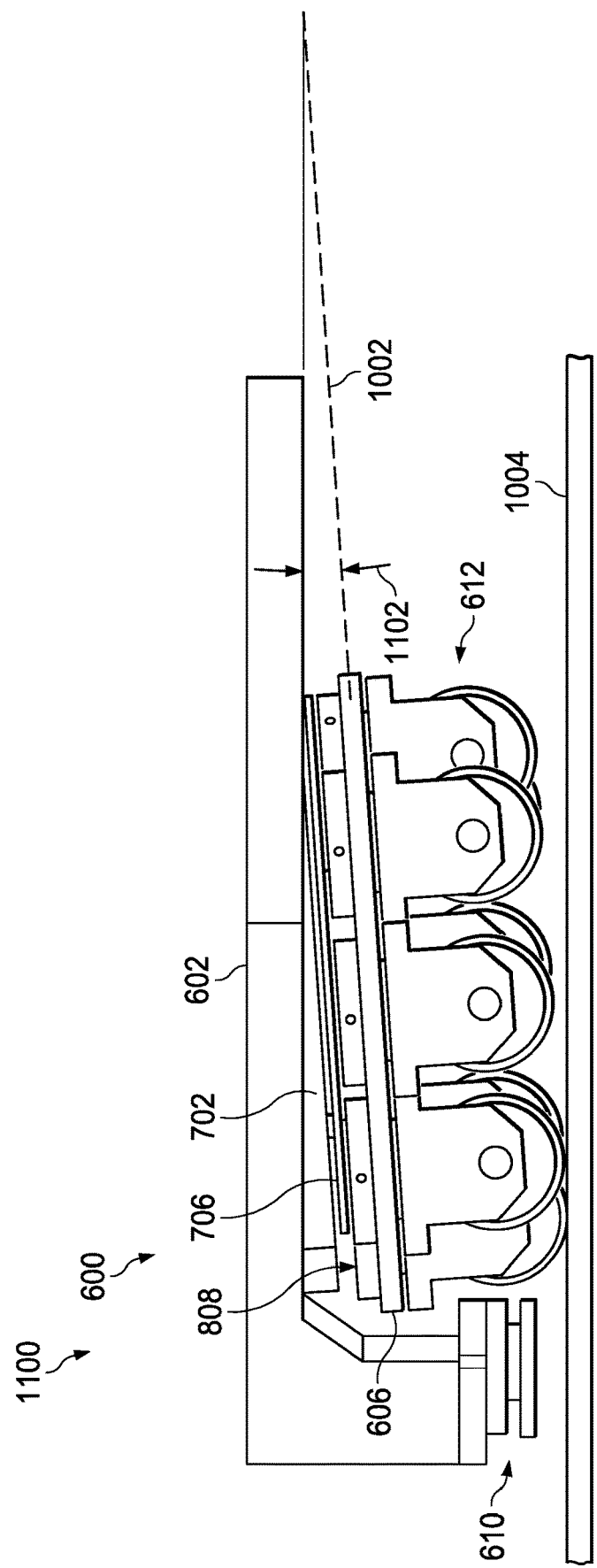
FIG. 11 is an illustration of an side view of a wheel assembly in a second position in accordance with an illustrative embodiment.

Turning now to FIG. 11, an illustration of an side view of a wheel assembly in a second position is depicted in accordance with an illustrative embodiment. View 1100 is a view of wheel assembly 600 from direction 10-10 of FIG. 8. View 1100 is a view of wheel assembly 600 as shown in FIG. 10, but with wheel plate 606 tilted.

In view 1100, plane 1002 of wheel plate 606 is not substantially parallel to manufacturing floor 1004. As plane 1002 is not substantially parallel to manufacturing floor 1004, number of roller assemblies 612 contact manufacturing floor 1004. As plane 1002 is not substantially parallel to manufacturing floor 1004, support foot 610 does not contact manufacturing floor 1004.

In view 1100, plane 1002 of wheel plate 606 may be at tilt angle 1102. Tilt angle 1102 may be any desirable angle. Tilt angle 1102 may be selected such that a desirable number of roller assemblies 612 may contact manufacturing floor 1004. In some illustrative examples, the desirable number of roller assemblies 612 contacting manufacturing floor 1004 may be between one and three roller assemblies. In other illustrative examples, the desirable number of roller assemblies 612 contacting manufacturing floor 1004 may be greater than three. The number of roller assemblies 612 contacting manufacturing floor 1004 may vary as wheel plate 606 rotates. The number of roller assemblies 612 contacting manufacturing floor 1004 may vary as tilt angle 1102 changes.

Tilt angle 1102 may be selected such that support foot 610 does not contact manufacturing floor 1004. In some illustrative examples, tilt angle 1102 may be between about −90 degrees and about 90 degrees. In one illustrative example, tilt angle 1102 may be equal to or less than about 0 degrees such that support foot 610 contacts manufacturing floor 1004. In one illustrative example, tilt angle 1102 may be between about 0 degrees and about −5 degrees such that support foot 610 contacts manufacturing floor 1004. In one illustrative example, tilt angle 1102 may be between about 0 degrees and −90 degrees such that support foot 610 contacts manufacturing floor 1004.

In one illustrative example, tilt angle 1102 may be greater than about 0 degrees such that a desirable number of roller assemblies 612 may contact manufacturing floor 1004. In some illustrative examples, tilt angle 1102 may be between about 0.05 degrees and 5 degrees such that the axis of rotation of wheel plate 606 is tiltable between about 0.05 degrees and 5 degrees. In some illustrative examples, tilt angle 1102 may be between about 0 degrees and about 5 degrees such that a desirable number of roller assemblies 612 may contact manufacturing floor 1004. In one illustrative example, tilt angle 1102 may be about 5 degrees such that a desirable number of roller assemblies 612 may contact manufacturing floor 1004. As depicted, tilt angle 1102 is about 5 degrees.

Figure 12:
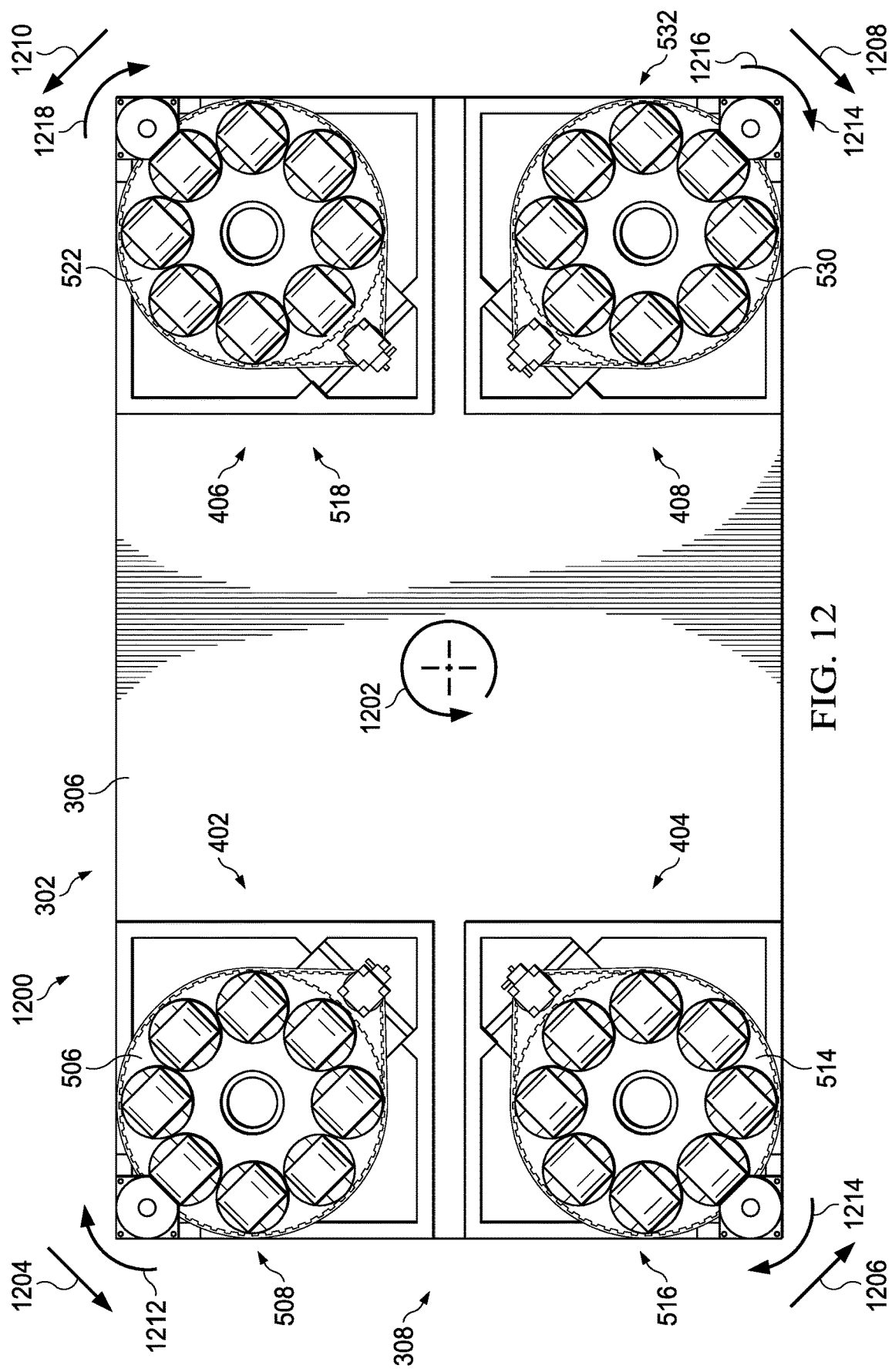
FIG. 12 is an illustration of a bottom view of a tool using a number of wheel assemblies and the respective drive vector of each wheel assembly in accordance with an illustrative embodiment.

Turning now to FIG. 12, an illustration of a bottom view of a tool using a number of wheel assemblies and the respective drive vector of each wheel assembly is depicted in accordance with an illustrative embodiment. View 1200 may be a bottom view of tool 302. Specifically, view 1200 may be a view of base 306 and number of wheel assemblies 308 from direction 5-5 of FIG. 4.

In view 1200, it may be desirable to move tool 302 and base 306 in direction 1202. To move tool 302 in direction 1202, at least one of wheel assembly 402, wheel assembly 404, wheel assembly 406, and wheel assembly 408 may be powered to drive tool 302 in direction 1202. For example, wheel plates of at least one of wheel assembly 402, wheel assembly 404, wheel assembly 406, and wheel assembly 408 may be rotated to drive tool 302 in direction 1202. In this illustrative example, direction 1202 may be a counterclockwise direction.

Direction 1202 may be compared to respective drive direction vectors of number of wheel assemblies 308. Each drive direction vector may remain constant as each respective wheel plate spins. For example, direction 1202 may be compared to each of drive direction vector 1204, drive direction vector 1206, drive direction vector 1208, and drive direction vector 1210. As depicted, each respective drive direction vector of a respective wheel assembly in the wheel assemblies may be substantially parallel to an axis of rotation of each roller of the respective wheel assembly. For example, drive direction vector 1204 of wheel assembly 402 may be substantially parallel to the axis of rotation of each roller of rollers 508.

A movement contribution for each of number of wheel assemblies 308 may be based on the comparison of each of drive direction vector 1204, drive direction vector 1206, drive direction vector 1208, and drive direction vector 1210 to direction 1202. Afterwards, each of the number of the wheel plates may rotate based on the movement contribution for each of number of wheel assemblies 308. A movement contribution may include a direction of movement of a respective wheel plate and a speed of a respective wheel plate.

In this illustrative example, wheel plate 506 of wheel assembly 402 may move in direction 1212. Direction 1212 may be a clockwise direction. Wheel plate 514 of wheel assembly 404 may move in direction 1214. Direction 1214 may be a clockwise direction. Wheel plate 530 of wheel assembly 408 may move in direction 1216. Direction 1216 may be a clockwise direction. Wheel plate 522 of wheel assembly 406 may move in direction 1218. Direction 1218 may be a clockwise direction. Although each of direction 1212, direction 1214, direction 1216, and direction 1218 are the same, the speed at which wheel plate 506, wheel plate 514, wheel plate 530, and wheel plate 522 move may not be the same. Further, the speed at which any wheel plate of wheel plate 506, wheel plate 514, wheel plate 530, and wheel plate 522 move may be the same or different as any other wheel plate of wheel plate 506, wheel plate 514, wheel plate 530, and wheel plate 522.

In this illustrative example, all of number of wheel assemblies 308 may have a number of rollers contacting a manufacturing floor to move tool 302 in direction 1202. In some illustrative examples, fewer than all of number of wheel assemblies 308 may be contacting the manufacturing floor.

How many of number of wheel assemblies 308 have rollers contacting the manufacturing floor may be determined based on at least one of the quantity of wheel assemblies in number of wheel assemblies 308, a desired number of contacts with the manufacturing floor for stability of tool 302, a desired floor loading, a desired load for each roller contacting the manufacturing floor, the drive direction vector of each of number of wheel assemblies 308, or other desirable factors. For example, number of wheel assemblies 308 may be eight wheel assemblies instead of four. In one illustrative example, fewer than eight wheel assemblies may have rollers contacting the manufacturing floor. In other illustrative examples, all eight wheel assemblies may have rollers contacting the manufacturing floor.

Figure 13:
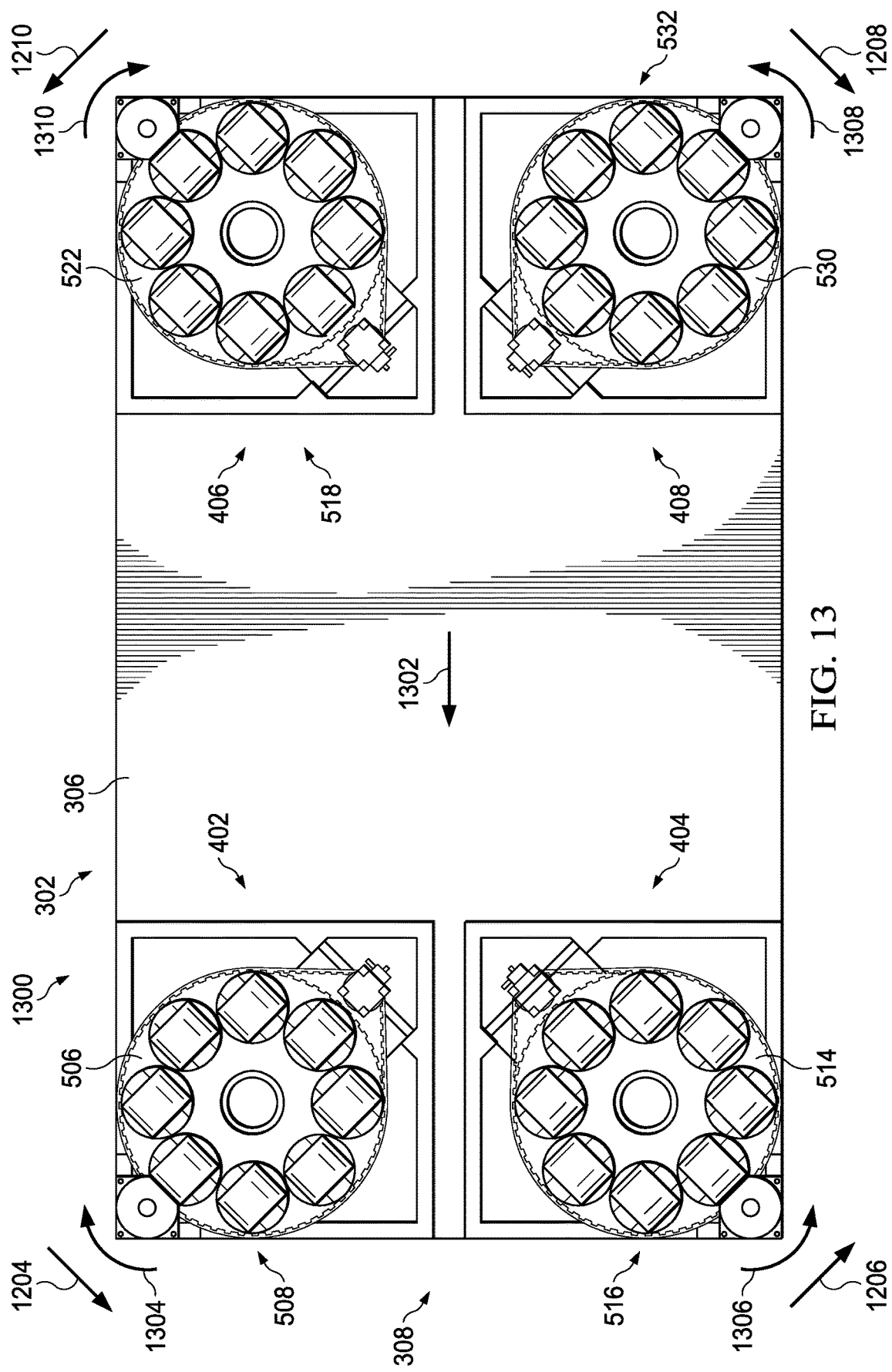
FIG. 13 is an illustration of a bottom view of a tool using a number of wheel assemblies and the respective movement of each wheel assembly to move the tool in a first direction in accordance with an illustrative embodiment.

Turning now to FIG. 13, an illustration of a bottom view of a tool using a number of wheel assemblies and the respective movement of each wheel assembly to move the tool in a first direction is depicted in accordance with an illustrative embodiment. View 1300 may be a bottom view of tool 302. Specifically, view 1300 may be a view of base 306 and number of wheel assemblies 308 from direction 5-5 of FIG. 4.

In view 1300, it may be desirable to move tool 302 and base 306 in direction 1302. To move tool 302 in direction 1302, at least one of wheel assembly 402, wheel assembly 404, wheel assembly 406, and wheel assembly 408 may be powered to drive tool 302 in direction 1302. For example, wheel plates of at least one of wheel assembly 402, wheel assembly 404, wheel assembly 406, and wheel assembly 408 may be rotated to drive tool 302 in direction 1302.

Direction 1302 may be compared to respective drive direction vectors of number of wheel assemblies 308. Each drive direction vector may remain constant as each respective wheel plate spins. For example, direction 1302 may be compared to each of drive direction vector 1204, drive direction vector 1206, drive direction vector 1208, and drive direction vector 1210. As depicted, each respective drive direction vector of a respective wheel assembly in the wheel assemblies may be substantially parallel to an axis of rotation of each roller of the respective wheel assembly. For example, drive direction vector 1204 of wheel assembly 402 may be substantially parallel to the axis of rotation of each roller of rollers 508.

A movement contribution for each of number of wheel assemblies 308 may be based on the comparison of each of drive direction vector 1204, drive direction vector 1206, drive direction vector 1208, and drive direction vector 1210 to direction 1302. Afterwards, each of the number of the wheel plates may rotate based on the movement contribution for each of number of wheel assemblies 308. A movement contribution may include a direction of movement of a respective wheel plate and a speed of a respective wheel plate.

In this illustrative example, wheel plate 506 of wheel assembly 402 may move in direction 1304. Direction 1304 may be a clockwise direction. Wheel plate 514 of wheel assembly 404 may move in direction 1306. Direction 1306 may be a counter-clockwise direction. Wheel plate 530 of wheel assembly 408 may move in direction 1308. Direction 1308 may be a counter-clockwise direction. Wheel plate 522 of wheel assembly 406 may move in direction 1310. Direction 1310 may be a clockwise direction. Although direction 1306 and direction 1308 are the same, the speed at which wheel plate 514 and wheel plate 530 move may not be the same. Although direction 1304 and direction 1310 are the same, the speed at which wheel plate 506 and wheel plate 522 move may not be the same. Further, the speed at which any wheel plate of wheel plate 506, wheel plate 514, wheel plate 530, and wheel plate 522 move may be the same or different as any other wheel plate of wheel plate 506, wheel plate 514, wheel plate 530, and wheel plate 522.

In this illustrative example, all of number of wheel assemblies 308 may have a number of rollers contacting a manufacturing floor to move tool 302 in direction 1302. In some illustrative examples, fewer than all of number of wheel assemblies 308 may be contacting the manufacturing floor.

Figure 14:
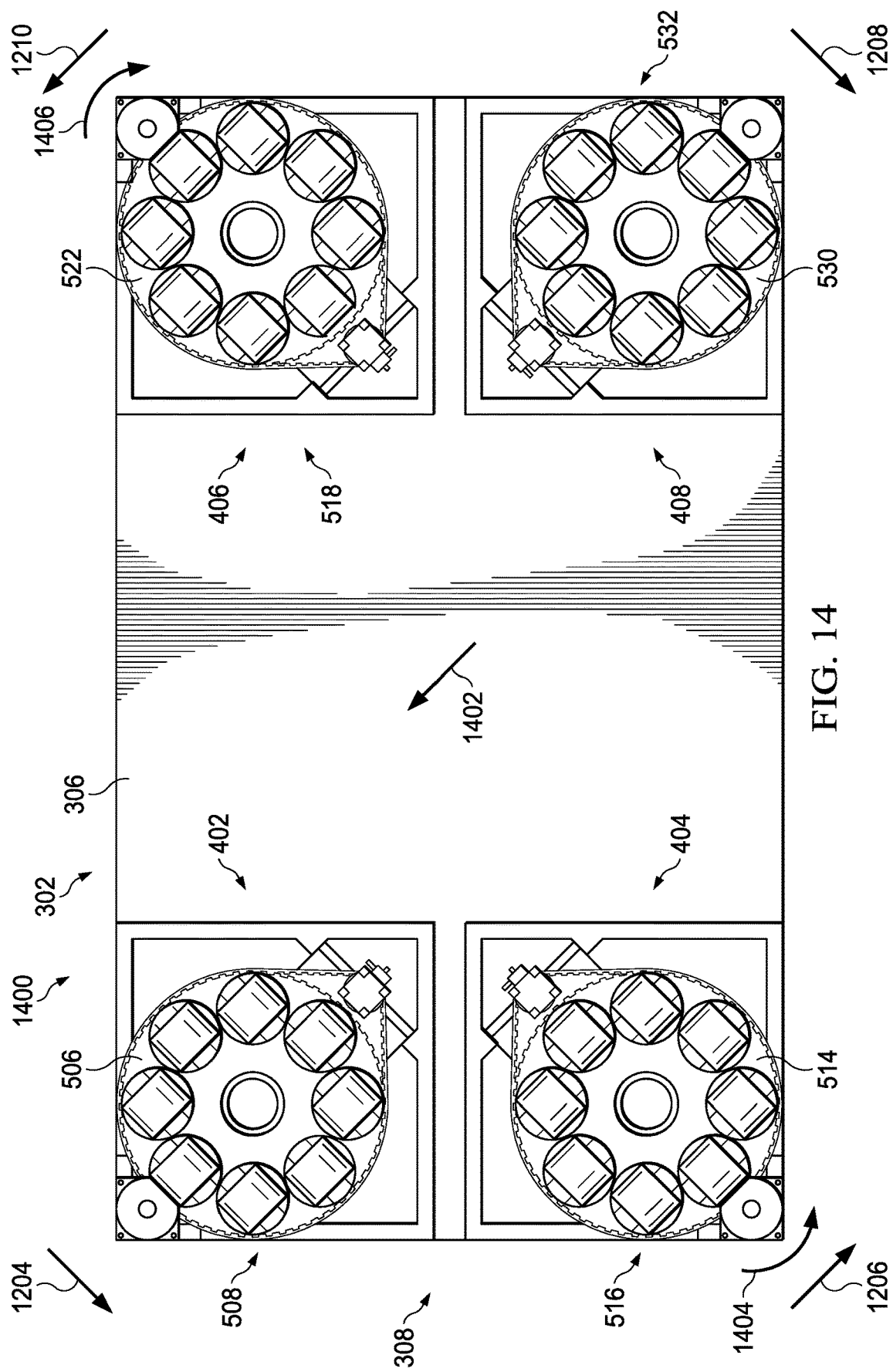
FIG. 14 is an illustration of a bottom view of a tool using a number of wheel assemblies and the respective movement of each wheel assembly to move the tool in a second direction in accordance with an illustrative embodiment.

Turning now to FIG. 14, an illustration of a bottom view of a tool using a number of wheel assemblies and the respective movement of each wheel assembly to move the tool in a second direction is depicted in accordance with an illustrative embodiment. View 1400 may be a bottom view of tool 302. Specifically, view 1400 may be a view of base 306 and number of wheel assemblies 308 from direction 5-5 of FIG. 4.

In view 1400, it may be desirable to move tool 302 and base 306 in direction 1402. To move tool 302 in direction 1402, at least one of wheel assembly 402, wheel assembly 404, wheel assembly 406, and wheel assembly 408 may be powered to drive tool 302 in direction 1402. For example, wheel plates of at least one of wheel assembly 402, wheel assembly 404, wheel assembly 406, and wheel assembly 408 may be rotated to drive tool 302 in direction 1402.

Direction 1402 may be compared to respective drive direction vectors of number of wheel assemblies 308. For example, direction 1402 may be compared to each of drive direction vector 1204, drive direction vector 1206, drive direction vector 1208, and drive direction vector 1210. As depicted, each respective drive direction vector of a respective wheel assembly in the wheel assemblies may be substantially parallel to an axis of rotation of each roller of the respective wheel assembly. For example, drive direction vector 1204 of wheel assembly 402 may be substantially parallel to the axis of rotation of each roller of rollers 508.

A movement contribution for each of number of wheel assemblies 308 may be based on the comparison of each of drive direction vector 1204, drive direction vector 1206, drive direction vector 1208, and drive direction vector 1210 to direction 1402. Afterwards, a number of the wheel plates may rotate based on the movement contribution for each of number of wheel assemblies 308. A movement contribution may include a direction of movement of a respective wheel plate and a speed of a respective wheel plate.

In this illustrative example, only wheel plate 514 of wheel assembly 404 and wheel plate 522 of wheel assembly 406 may be rotated to drive tool 302 in direction 1402. In this illustrative example, wheel plate 506 of wheel assembly 402 and wheel plate 530 of wheel assembly 408 may remain substantially stationary.

Drive direction vector 1204 and drive direction vector 1208 are each substantially perpendicular to direction 1402. As drive direction vector 1204 and drive direction vector 1208 are substantially perpendicular to direction 1402, rollers 508 and rollers 532 may roll freely in direction 1402.

In this illustrative example, wheel plate 506 may not move. Wheel plate 514 of wheel assembly 404 may move in direction 1404. Direction 1404 may be a counter-clockwise direction. Wheel plate 530 of wheel assembly 408 may not move. Wheel plate 522 of wheel assembly 406 may move in direction 1406. Direction 1406 may be a clockwise direction. The speed at which wheel plate 514 and wheel plate 522 move may not be the same.

In this illustrative example, all of number of wheel assemblies 308 may have a number of rollers contacting a manufacturing floor to move tool 302 in direction 1402. In some illustrative examples, fewer than all of number of wheel assemblies 308 may be contacting the manufacturing floor.

Figure 15:
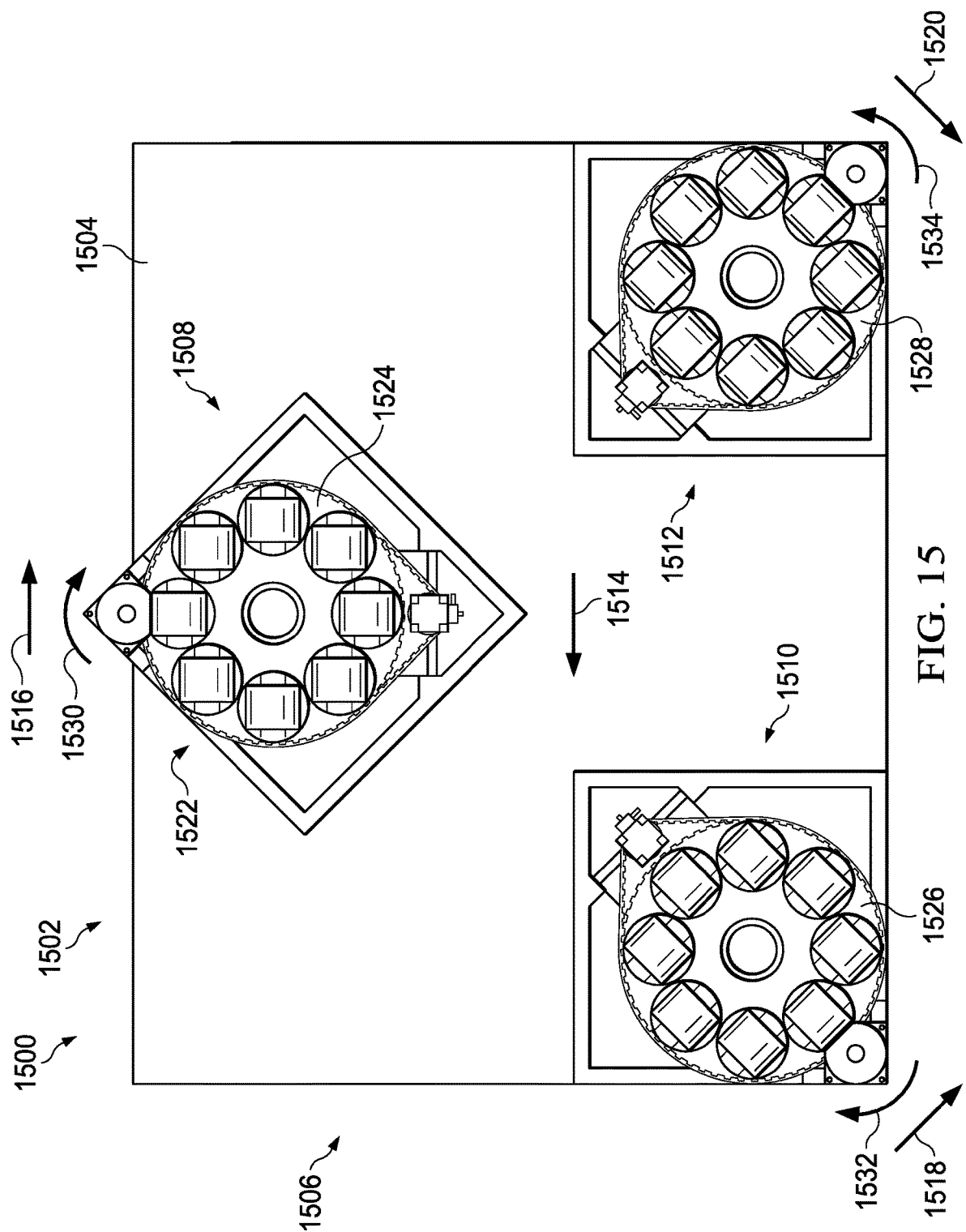
FIG. 15 is an illustration of a bottom view of a tool using a number of wheel assemblies and the respective movement of each wheel assembly to move the tool in a direction in accordance with an illustrative embodiment.

Turning now to FIG. 15, an illustration of a bottom view of a tool using a number of wheel assemblies and the respective movement of each wheel assembly to move the tool in a direction is depicted in accordance with an illustrative embodiment. View 1500 may be a bottom view of a tool. Specifically, view 1500 may be a view of a base, such as base 306, but having a number of wheel assemblies different than number of wheel assemblies 308 as depicted in FIGS. 4-5 and 12-14.

In view 1500, tool 1502 may have base 1504 and number of wheel assemblies 1506. Number of wheel assemblies 1506 may include wheel assembly 1508, wheel assembly 1510, and wheel assembly 1512. As can be seen in view 1500, base 1504 of tool 1502 may be substantially the same as base 306 of tool 302 but with only three wheel assemblies.

It may be desirable to move tool 1502 and base 1504 in direction 1514. To move tool 1502 in direction 1514, at least one of wheel assembly 1508, wheel assembly 1510, or wheel assembly 1512 may be powered to drive tool 1502 in direction 1514. For example, wheel plates of at least one of wheel assembly 1508, wheel assembly 1510, or wheel assembly 1512 may be rotated to drive tool 1502 in direction 1514.

Direction 1514 may be compared to respective drive direction vectors of number of wheel assemblies 1506. For example, direction 1514 may be compared to each of drive direction vector 1516, drive direction vector 1518, and drive direction vector 1520. As depicted, each respective drive direction vector of a respective wheel assembly in the wheel assemblies may be substantially parallel to an axis of rotation of each roller of the respective wheel assembly. For example, drive direction vector 1516 of wheel assembly 1508 may be substantially parallel to the axis of rotation of each roller of rollers 1522.

A movement contribution for each of number of wheel assemblies 1506 may be based on the comparison of each of drive direction vector 1516, drive direction vector 1518, and drive direction vector 1520 to direction 1514. Afterwards, a number of the wheel plates may rotate based on the movement contribution for each of number of wheel assemblies 1506. A movement contribution may include a direction of movement of a respective wheel plate and a speed of a respective wheel plate.

In this illustrative example, all of wheel plate 1524 of wheel assembly 1508, wheel plate 1526 of wheel assembly 1510, and wheel plate 1528 of wheel assembly 1512 may be rotated to drive tool 1502 in direction 1514. In this illustrative example, wheel plate 1524 of wheel assembly 1508 may move in direction 1530. Direction 1530 may be a clockwise direction. Wheel plate 1526 of wheel assembly 1510 may move in direction 1532. Direction 1532 may be a clockwise direction. Wheel plate 1528 of wheel assembly 1512 may move in direction 1534. Direction 1534 may be a counter-clockwise direction. The speed at which wheel plate 1524, wheel plate 1526, and wheel plate 1528 move may not be the same. Further, the speed at which any wheel plate of wheel plate 1524, wheel plate 1526, and wheel plate 1528 move may be the same or different as any other wheel plate of wheel plate 1524, wheel plate 1526, and wheel plate 1528.

In this illustrative example, number of wheel assemblies 1506 may include three wheel assemblies. As a result, in this illustrative example, all of number of wheel assemblies 1506 may have a number of rollers contacting a manufacturing floor to move tool 1502 in direction 1514. However, in some illustrative examples, number of wheel assemblies 1506 may include a greater number of wheel assemblies than three. In these illustrative examples, all of number of wheel assemblies 1506 need not contact the manufacturing floor.

Figure 16:
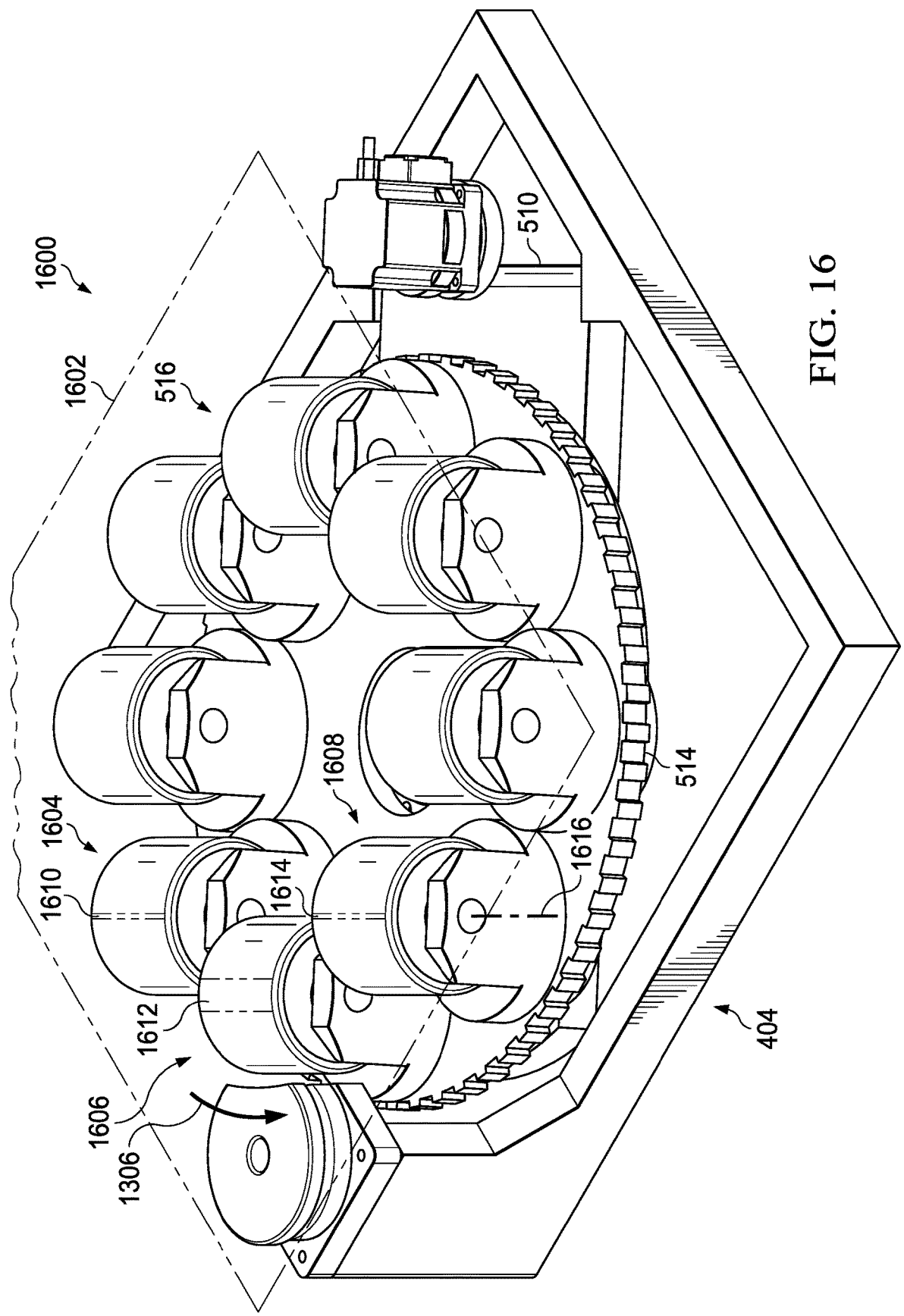
FIG. 16 is an illustration of a wheel assembly contacting a plane in accordance with an illustrative embodiment.

Turning now to FIG. 16, an illustration of a wheel assembly contacting a plane is depicted in accordance with an illustrative embodiment. View 1600 may be a view of a wheel assembly of number of wheel assemblies 308 of tool 302 contacting manufacturing floor 304 as shown in FIG. 3. For example, view 1600 may be a view of wheel assembly 404 contacting manufacturing floor 304.

View 1600 may be a view of wheel assembly 404 from direction 16-16 of FIG. 5. Plane 1602 may be a translucent representation of manufacturing floor 304. As illustrated, roller 1604, roller 1606, and roller 1608 of rollers 516 contact plane 1602. Surface area 1610 of roller 1604 may contact plane 1602. Surface area 1612 of roller 1606 may contact plane 1602. Surface area 1614 of roller 1608 may contact plane 1602. Surface area 1610 may be less than surface area 1612. Surface area 1614 may be less than surface area 1612. Surface area 1610 and surface area 1614 may be substantially the same.

Surface area 1610, surface area 1612, and surface area 1614 may be influenced by at least one of weight of tool 302, material of rollers 516, a number of wheel assemblies contacting plane 1602, a number of rollers contacting plane 1602, tilt angle of wheel plate 514 about tilt axis 510, or other factors. For example, if the weight of tool 302 increases, at least one of surface area 1610, surface area 1612, or surface area 1614 may increase. As another example, should the material of rollers 516 be softer, at least one of surface area 1610, surface area 1612, or surface area 1614 increases.

View 1600 may be a representation of wheel assembly 404 at a single time as wheel assembly 404 moves in direction 1306. At a different point in time different rollers of rollers 516 may contact plane 1602. Further, at a different point in time, as wheel assembly 404 moves in direction 1306, a different number of rollers of rollers 516 may contact plane 1602.

Figure 17:
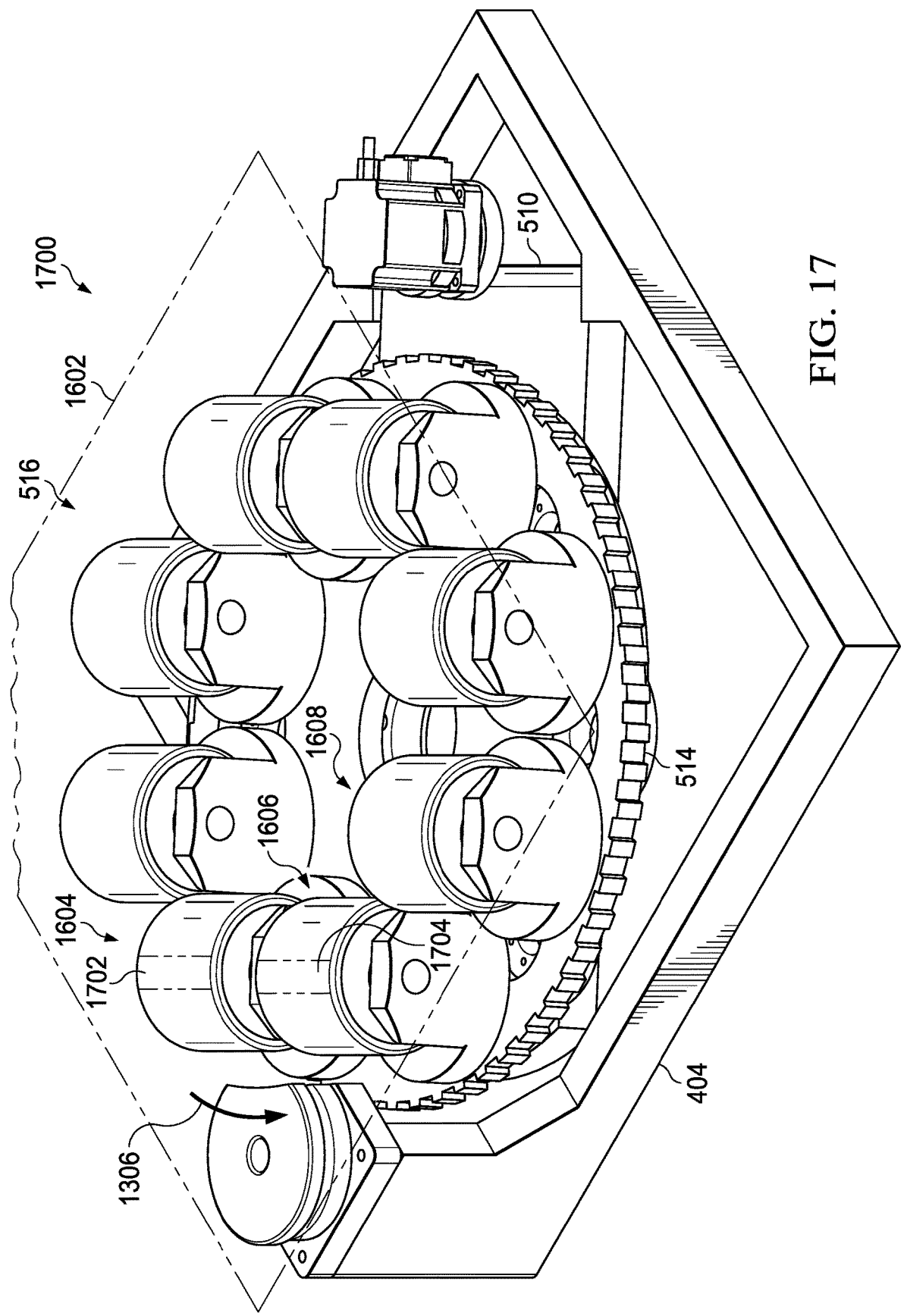
FIG. 17 is an illustration of a wheel assembly contacting a plane in accordance with an illustrative embodiment.

Turning now to FIG. 17, an illustration of a wheel assembly contacting a plane is depicted in accordance with an illustrative embodiment. View 1700 may be a view of a wheel assembly of number of wheel assemblies 308 of tool 302 contacting manufacturing floor 304 as shown in FIG. 3. For example, view 1700 may be a view of wheel assembly 404 contacting manufacturing floor 304.

View 1700 may be a view of wheel assembly 404 from direction 16-16 of FIG. 5. As illustrated, roller 1604 and roller 1606 of rollers 516 contact plane 1602. Surface area 1702 of roller 1604 may contact plane 1602. Surface area 1704 of roller 1606 may contact plane 1602. Surface area 1702 may be substantially the same as surface area 1704. As wheel plate 514 rotates in direction 1306, surface area 1702 and surface area 1704 may change.

View 1700 may be a representation of wheel assembly 404 at a single time as wheel assembly 404 moves in direction 1306. View 1700 may be a view of wheel assembly 404 after wheel plate 514 has rotated in direction 1306 from view 1700. At a different point in time, different rollers of rollers 516 may contact plane 1602. Further, at a different point in time, as wheel assembly 404 moves in direction 1306, a different number of rollers of rollers 516 may contact plane 1602.

Figure 18:
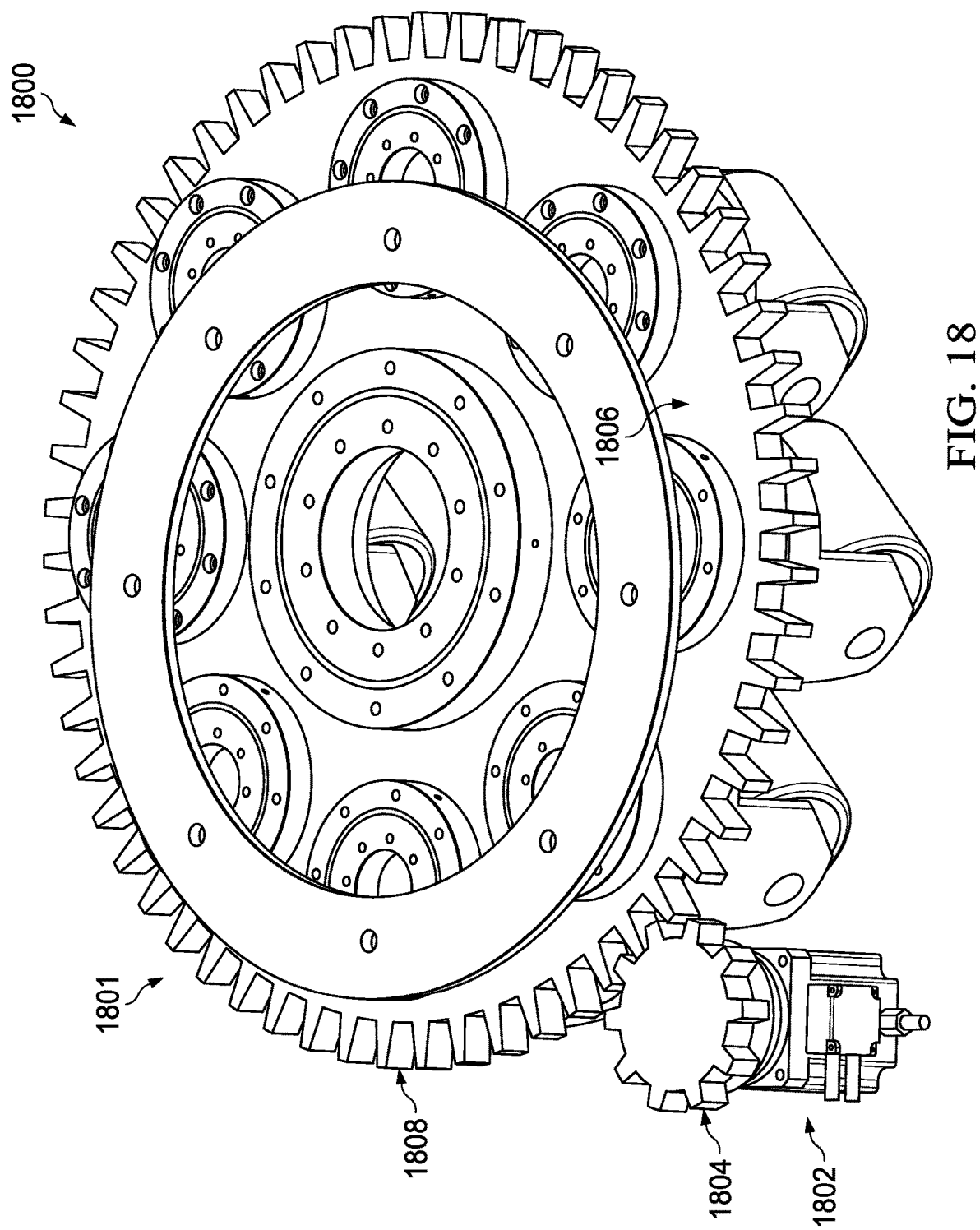
FIG. 18 is an illustration of one example of a connection between a wheel assembly and a driver in accordance with an illustrative embodiment.

Turning now to FIG. 18, an illustration of one example of a connection between a wheel assembly and a driver is depicted in accordance with an illustrative embodiment. View 1800 may be a view of a wheel assembly with the base and mounting frame removed for clarity. Wheel assembly components 1801 may be illustrations of components of wheel assembly 273 of FIG. 2.

In this illustrative example, driver 1802 is associated with gear 1804. Gear 1804 may be a pinion gear. Wheel plate 1806 may have integral teeth 1808. Integral teeth 1808 may interface with gear 1804. As a result, wheel plate 1806 may function as a gear. Because of integral teeth 1808, wheel plate 1806 may include an integral gear 1810 associated with a pinion gear 1804 of driver 1802.

Figure 19:
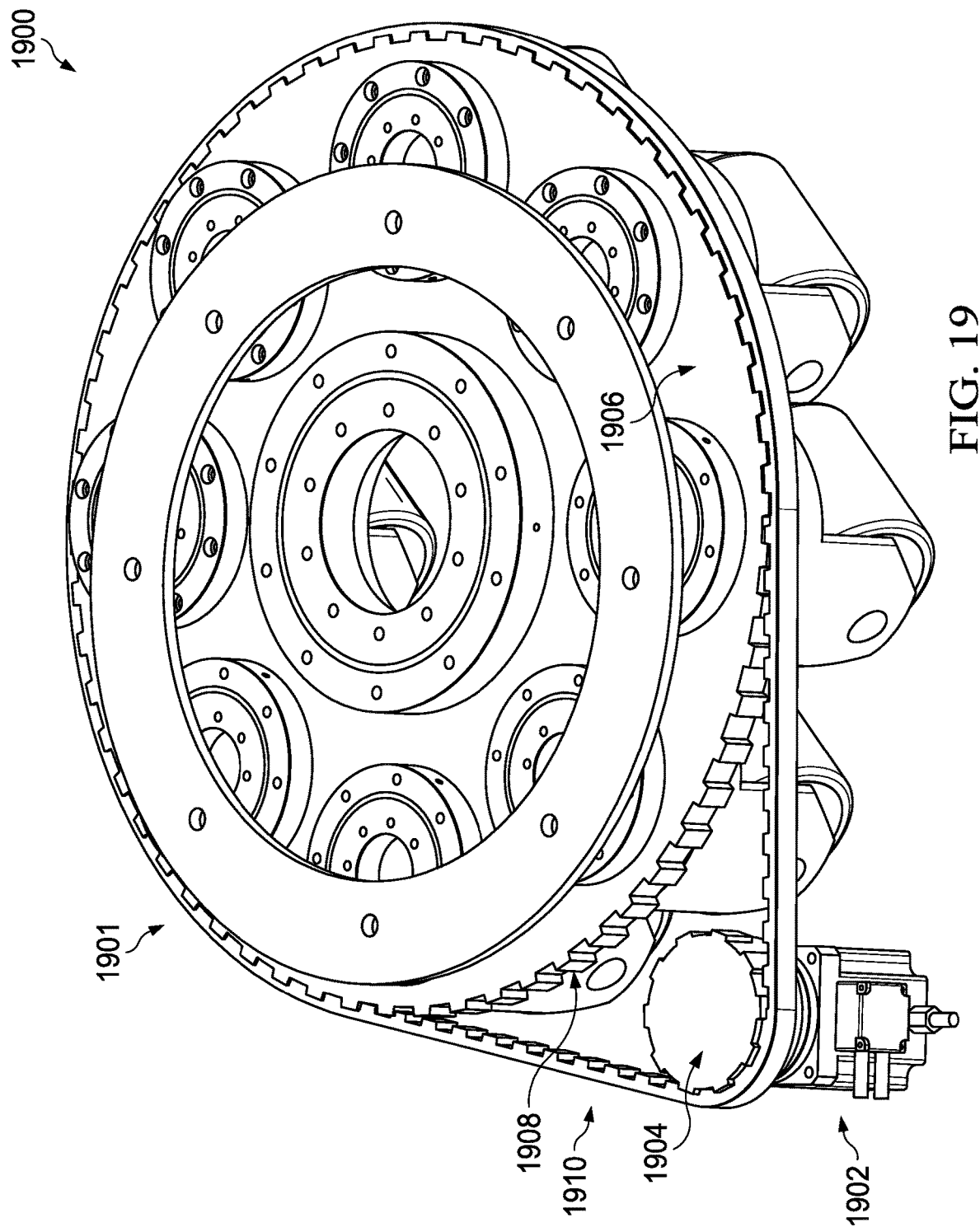
FIG. 19 is an illustration of another example of a connection between a wheel assembly and a driver in accordance with an illustrative embodiment.

Turning now to FIG. 19, an illustration of another example of a connection between a wheel assembly and a driver is depicted in accordance with an illustrative embodiment. View 1900 may be a view of a wheel assembly with the base and mounting frame removed for clarity. Wheel assembly components 1901 may be illustrations of components of wheel assembly 273 of FIG. 2.

In this illustrative example, driver 1902 is associated with gear 1904. Gear 1904 may be a pinion gear. Wheel plate 1906 may have integral teeth 1908. Integral teeth 1908 may interface with flexible rack 1910. As a result, wheel plate 1906 may function as a gear. Flexible rack 1910 may also interface with gear 1904. Thus, gear 1904 may drive movement of wheel plate 1906 without directly contacting wheel plate 1906. As a result of integral teeth 1908, wheel plate 1906 may include an integral gear associated with a pinion gear 1904 of a driver 1902.

Figure 20:
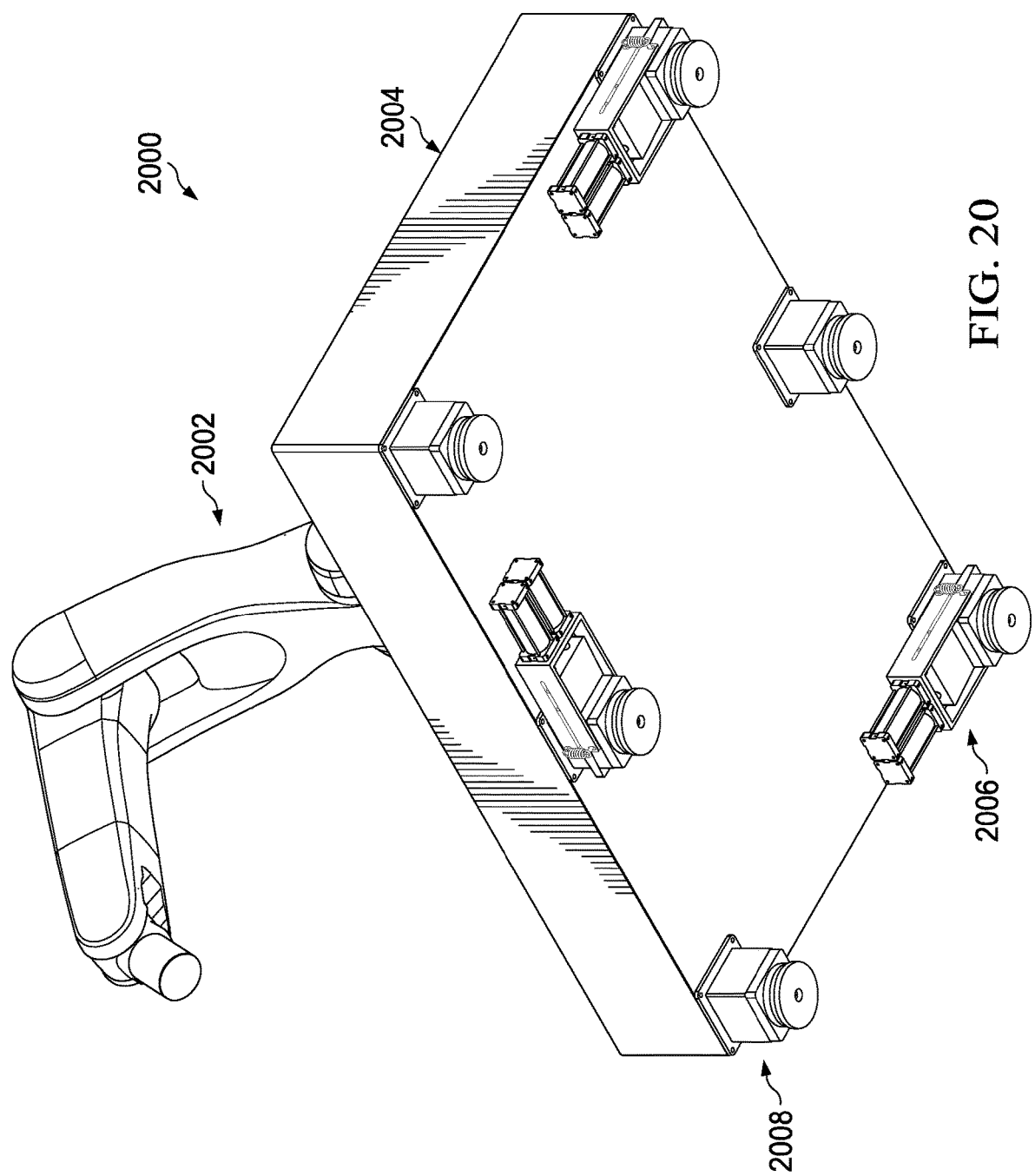
FIG. 20 is an illustration of a bottom isometric view of a tool with a number of wedge jacks in accordance with an illustrative embodiment.

Turning now to FIG. 20, an illustration of a bottom isometric view of a tool with a number of wedge jacks is depicted in accordance with an illustrative embodiment. Manufacturing environment 2000 may be a physical embodiment of manufacturing environment 200 of FIG. 2. Manufacturing environment 2000 may have tool 2002. Tool 2002 may have base 2004 with number of wedge jacks 2006 and number of stationary feet 2008. In some illustrative examples, tool 2002 may rest on number of wedge jacks 2006. In some illustrative examples, tool 2002 may rest on number of stationary feet 2008. In some illustrative examples, tool 2002 may rest on both number of stationary feet 2008 and number of wedge jacks 2006. In some illustrative examples, tool 2002 may rest on a portion of number of stationary feet 2008 and a portion of number of wedge jacks 2006.

In some illustrative examples, other components may be associated with base 2004. For example, in some illustrative examples, a number of wheel assemblies, such as number of wheel assemblies 214 of FIG. 2, may be associated with base 2004.

Figure 21:
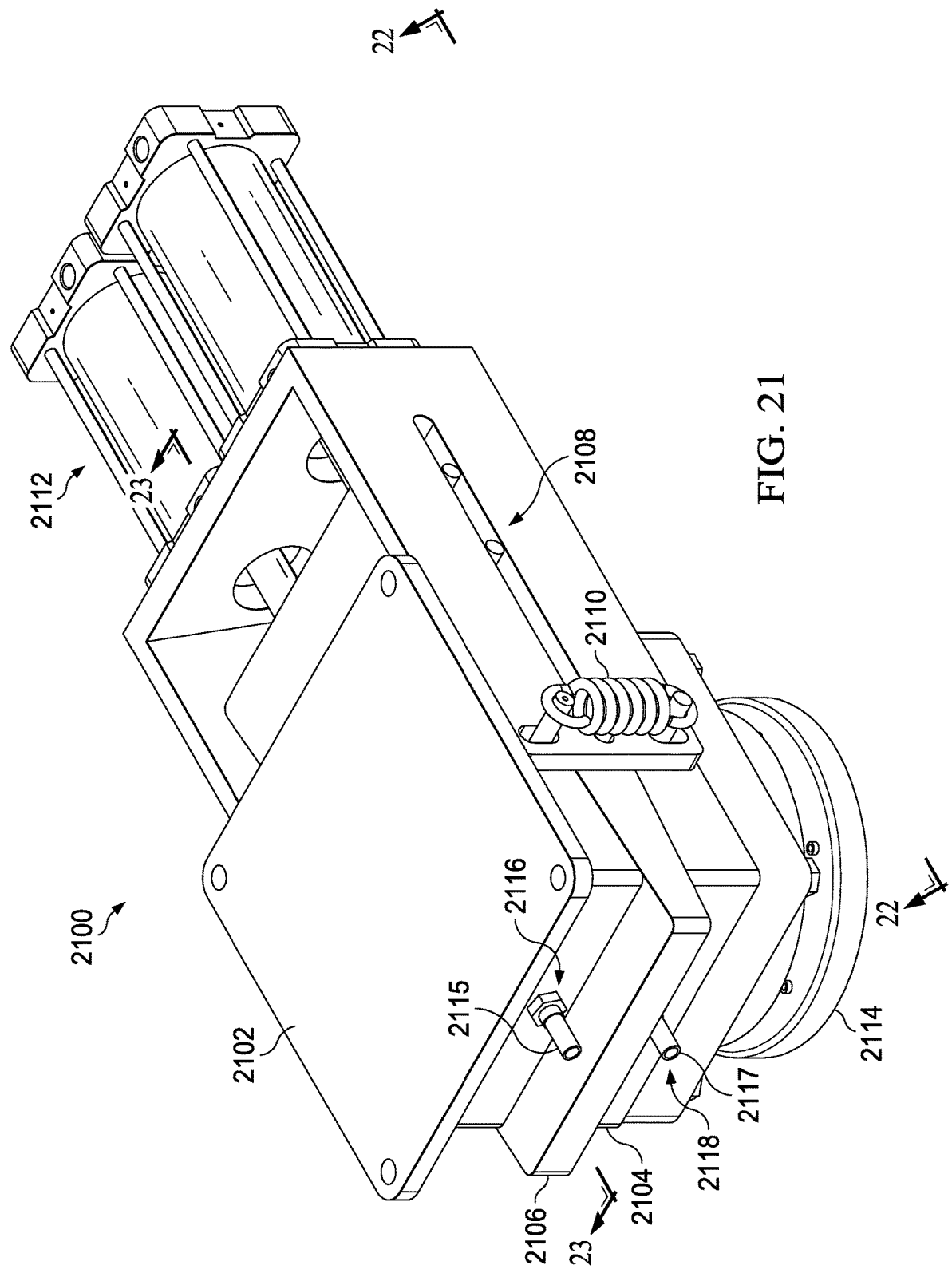
FIG. 21 is an illustration of an isometric view of a wedge jack in accordance with an illustrative embodiment.

Turning now to FIG. 21, an illustration of an isometric view of a wedge jack is depicted in accordance with an illustrative embodiment. Wedge jack 2100 may be a physical embodiment of wedge jack 281 of FIG. 2. Wedge jack 2100 may be one of number of wedge jacks 2006 of FIG. 20.

Wedge jack 2100 may include upper frame 2102, lower frame 2104, and wedge 2106 slideably located between upper frame 2102 and lower frame 2104. Lower frame 2104 may be associated with upper frame 2102. Bias system 2108 may be connected to upper frame 2102 and lower frame 2104. Bias system 2108 may bias upper frame 2102 and lower frame 2104 towards each other. Bias system 2108 may include spring 2110. In some illustrative examples, bias system 2108 may include additional components other than spring 2110. In some illustrative examples, bias system 2108 may include biasing components instead of spring 2110. Other biasing components may be selected from a dashpot, a polymeric material, or other desirable biasing component.

Force applicator 2112 may be associated with wedge 2106. Force applicator 2112 may be associated with at least one of a pneumatic force, a hydraulic force, an electromechanical force, or a mechanical force.

As depicted, wedge jack 2100 also includes foot 2114 associated with lower frame 2104. Foot 2114 may impact a manufacturing floor such as manufacturing floor 204 of FIG. 2.

Wedge jack 2100 may also include inlet 2115 of upper air bearing 2116 and inlet 2117 of lower air bearing 2118. Upper air bearing 2116 may be coupled to upper frame 2102 and lower air bearing 2118 may be coupled to lower frame 2104. Inlet 2115 and inlet 2117 may receive and direct air into air bearing 2116 and air bearing 2118.

Upper air bearing 2116 and lower air bearing 2118 may be configured to suspend wedge 2106 substantially frictionless. Upper air bearing 2116 and lower air bearing 2118 may be activated by applying pressurized gas to upper air bearing 2116 and lower air bearing 2118. When upper air bearing 2116 and lower air bearing 2118 are activated, wedge 2106 may be moved by force applicator 2112. By moving wedge 2106 relative to upper frame 2102 and lower frame 2104, a height of wedge jack 2100 may be changed. For example, by moving wedge 2106 relative to upper frame 2102 and lower frame 2104, the distance between upper frame 2102 and lower frame 2104 may be increased, increasing the height of wedge jack 2100. As another example, by moving wedge 2106 relative to upper frame 2102 and lower frame 2104, the distance between upper frame 2102 and lower frame 2104 may be decreased, decreasing the height of wedge jack 2100.

When upper air bearing 2116 and lower air bearing 2118 are not activated, friction may maintain the position of wedge 2106 relative to upper frame 2102 and lower frame 2104. Specifically, the friction between wedge 2106 and upper air bearing 2116 and lower air bearing 2118 may maintain the position of wedge 2106 relative to upper frame 2102 and lower frame 2104. Friction between wedge 2106 and upper air bearing 2116 and lower air bearing 2118 may be sufficient to overcome the angle produced lateral force generated by the weight of a tool resting on wedge lift 2100.

The material of upper air bearing 2116 and lower air bearing 2118 may be selected such that the friction between wedge 2106 and upper air bearing 2116 and lower air bearing 2118 is desirable. For example, the material of upper air bearing 2116 and lower air bearing 2118 may be selected such that the friction between wedge 2106 and upper air bearing 2116 and lower air bearing 2118 is sufficient to maintain the position of wedge 2106 relative to upper frame 2102 and lower frame 2104. In some illustrative examples, upper air bearing 2116 and lower air bearing 2118 may be formed of a metal with micro holes. The micro holes may be drilled or laser cut in the metal. In some illustrative examples, upper air bearing 2116 and lower air bearing 2118 may be formed of at least one of sintered bronze, porous carbon, or steel.

The material of wedge 2106 may be selected such that friction between wedge 2106 and upper air bearing 2116 and lower air bearing 2118 is desirable. For example, the material of wedge 2106 may be selected such that the friction between wedge 2106 and upper air bearing 2116 and lower air bearing 2118 is sufficient to maintain the position of wedge 2106 relative to upper frame 2102 and lower frame 2104. In some illustrative examples, wedge 2106 may be formed of a roughened metal. In some illustrative examples, this metal may be roughened through at least one of a mechanical process, a chemical process, or other desirable process.

Although wedge 2106 is depicted as maintaining its position using friction, in some illustrative examples, other forces may be applied to maintain the position of wedge 2106. For example, an actuator may provide a force to wedge 2106 to counteract the lateral force created by the weight of a tool resting on wedge jack 2100.

Figure 22:
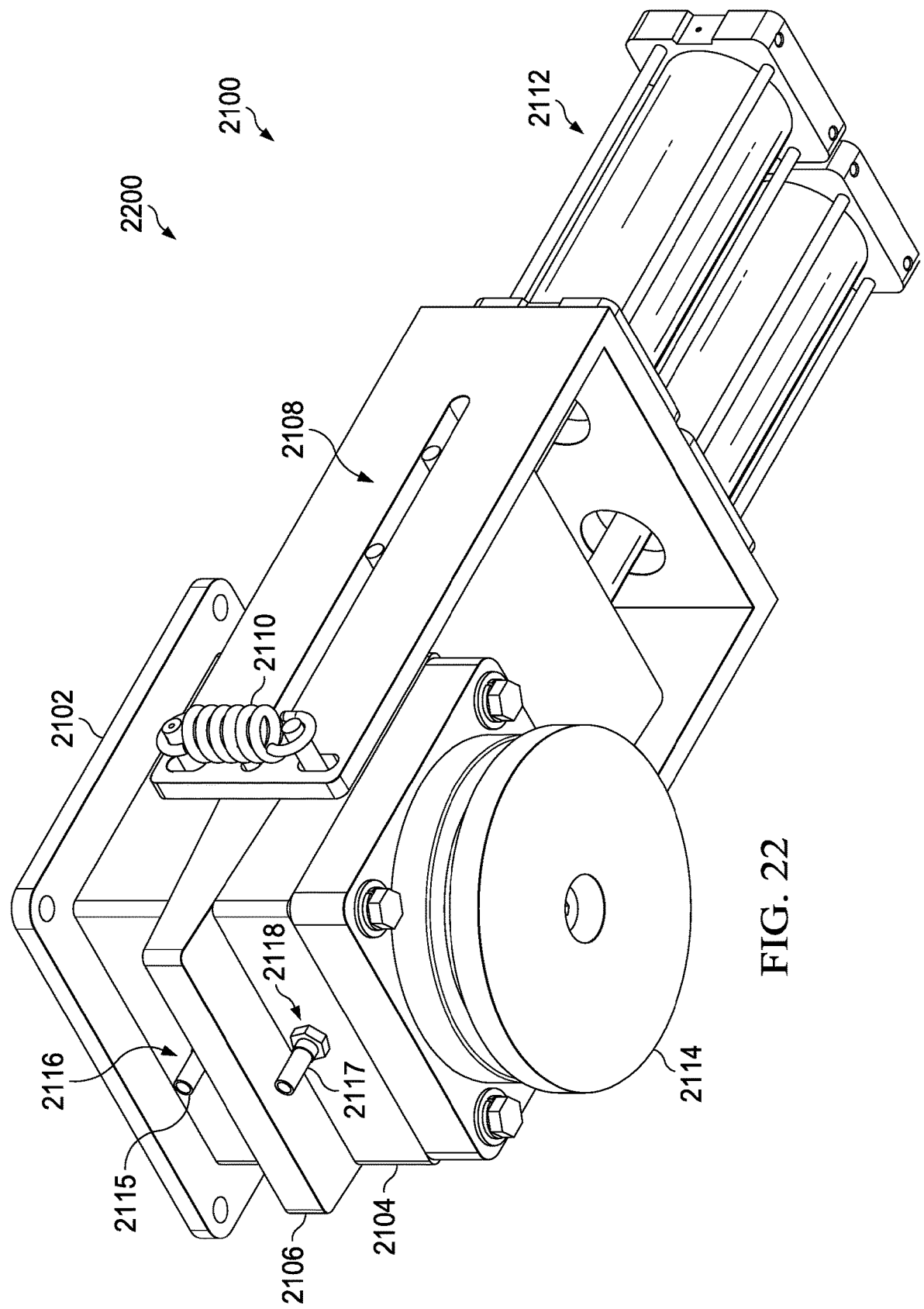
FIG. 22 is an illustration of an isometric bottom view of a wedge jack in accordance with an illustrative embodiment.

Turning now to FIG. 22, an illustration of an isometric bottom view of a wedge jack is depicted in accordance with an illustrative embodiment. View 2200 may be a view of wedge jack 2100 from direction 22-22 of FIG. 21.

Figure 23:
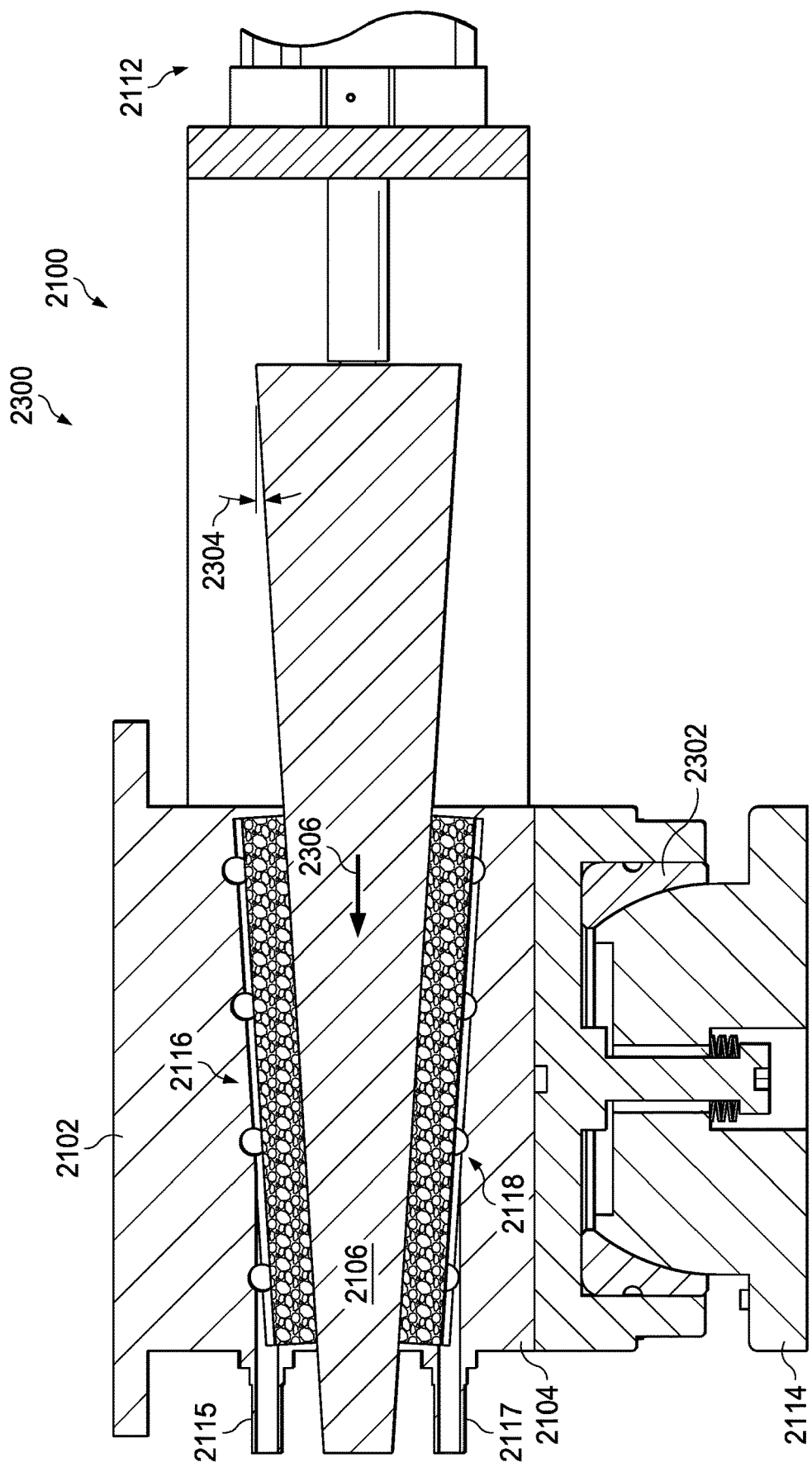
FIG. 23 is an illustration of a cross-sectional view of a wedge jack in accordance with an illustrative embodiment.

Turning now to FIG. 23, an illustration of a cross-sectional view of a wedge jack is depicted in accordance with an illustrative embodiment. View 2300 may be a view of wedge jack 2100 along cross-section 23-23(1) from direction 23-23(2).

As depicted in view 2300, wedge jack 2100 may include spherical bearing 2302 associated with lower frame 2104. Foot 2114 may be associated with spherical bearing 2302. Spherical bearing 2302 may allow foot 2114 to be substantially flush with a manufacturing floor. Spherical bearing 2302 may influence the compliance between foot 2114 and the manufacturing floor.

Wedge 2106 may have angle 2304. Angle 2304 may be any desirable angle greater than about 0 degrees and less than about 90 degrees. In some illustrative examples, angle 2304 may be from about 1 to about 10 degrees. Angle 2304 may affect the maintenance of position of wedge 2106 relative to upper frame 2102 and lower frame 2104 when upper air bearing 2116 and lower air bearing 2118 are not activated. For example, increasing angle 2304 may require a greater amount of friction to maintain the position of wedge 2106 relative to upper frame 2102 and lower frame 2104. Decreasing angle 2304 may reduce the amount of friction to maintain the position of wedge 2106 relative to upper frame 2102 and lower frame 2104.

Wedge 2106 may be acted on by a force in direction 2306. A force in direction 2306 acting on wedge 2106 may produce a desirable mechanical advantage. In some illustrative examples, the mechanical advantage may be approximately 8:1. The mechanical advantage may magnify the force generated by force applicator 2112.

The illustrations of aircraft 100 in FIG. 1, tool 302 in FIGS. 3-5 and 12-14, wheel assembly 600 in FIGS. 6-11, and 16-17, tool 1502 in FIG. 15, wheel assembly 1512 in FIG. 15, wedge jack 2100 in FIGS. 21-23, and manufacturing environment 200 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, stationary feet may also be associated with base 210 of tool 202. As another example, support foot 276 may not be associated with number of wheel assemblies 214.

Further, base 306 of tool 302 may have a number of wedge jacks associated. Yet further, base 2004 may be associated with a number of wheel assemblies. As another example, base 2004 may not be associated with number of stationary feet 2008. In one illustrative example, base 2004 may only be associated with number of wedge jacks 2006.

Number of wedge jacks 2006 may include any number of wedge jacks 2006. A desired quantity of wedge jacks in number of wedge jacks 2006 may be selected based on at least one of a weight of tool 2002, a desired number of contacts with the manufacturing floor for stability of tool 2002, a desired floor loading, a desired load for each wedge jack contacting the manufacturing floor, or other desirable factors.

Although wheel assembly 600 is depicted as having eight rollers, wheel assembly 600 may have any desirable number of rollers. For example, wheel assembly 600 may include three or more rollers. In some illustrative examples, wheel assembly 600 may have between eight and twelve rollers. By increasing the number of rollers, the size of the wheel assembly may be increased. Increasing the size of the wheel assembly may be undesirable. For example, increasing the size of the wheel assembly may reduce the number of components which may be associated with a base of the tool.

By increasing the number of rollers, the size of each roller may be decreased. By decreasing the size of the rollers, the load each roller may carry may be reduced. By reducing the number of rollers, the motion of an associated tool may become cruder. The motion of the associated tool may become cruder due to transfer of contact with the manufacturing floor between the rollers. With a smaller number of rollers, the transfer of load from one roller to another roller may be rougher than the transfer of load with a larger number of rollers. With a smaller number of rollers, each roller may contact the manufacturing floor for a higher percentage of time. Thus, the motion of the associated tool may become cruder due to the periodic pulsing duty cycle of each roller.

Additionally, although support foot 610 is associated with base 602, support foot 610 may be associated with other portions of wheel assembly 600. Yet further, although support foot 610 is depicted as perpendicular to base 602, support foot 610 may be at any desirable angle relative to base 602.

The different components shown in FIGS. 1 and 3-23 may be combined with components in FIG. 2, used with components in FIG. 2, or a combination of the two. Additionally, some of the components in FIGS. 1 and 3-23 may be illustrative examples of how components shown in block form in FIG. 2 may be implemented as physical structures.

Figure 24:
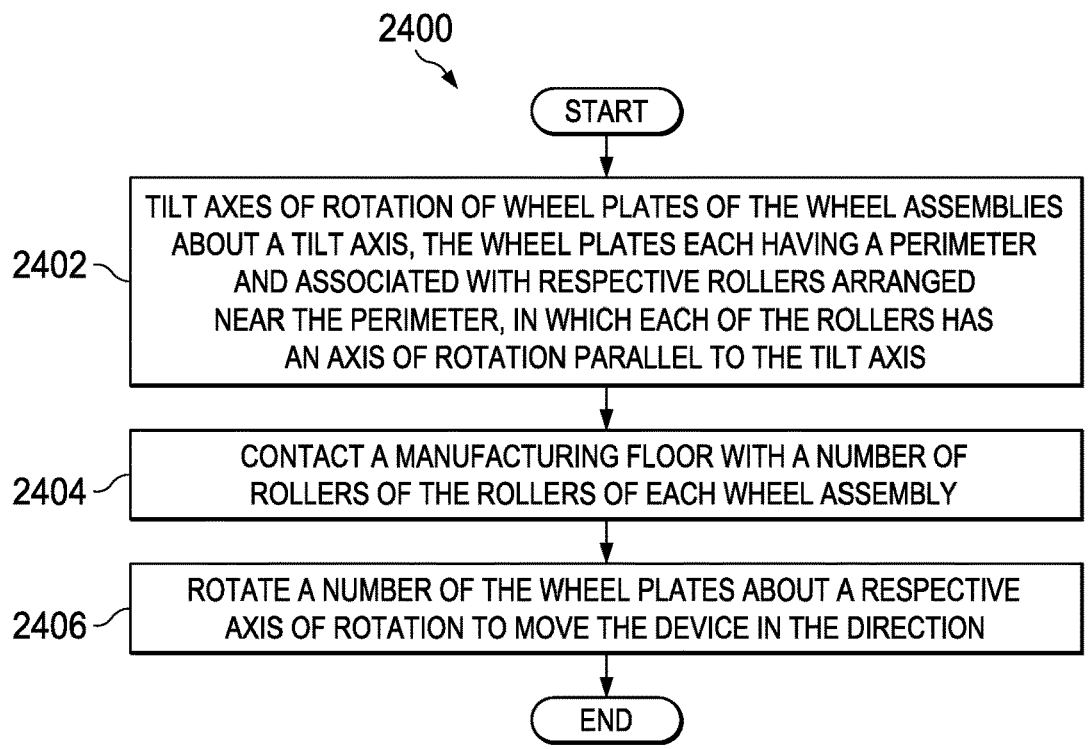
FIG. 24 is an illustration of a flowchart of a process for moving a device on wheel assemblies in a direction in accordance with an illustrative embodiment.

Turning now to FIG. 24, an illustration of a flowchart of a process for moving a device on wheel assemblies in a direction is depicted in accordance with an illustrative embodiment. Process 2400 may be used to move tool 202 of manufacturing environment 200 of FIG. 2. Process 2400 may be used to move a tool in a manufacturing environment to form a portion of aircraft 100 of FIG. 1.

Process 2400 may begin by tilting axes of rotation of wheel plates of the wheel assemblies about a tilt axis, the wheel plates each having a perimeter and associated with respective rollers arranged near the perimeter, in which each of the rollers has an axis of rotation parallel to the tilt axis (operation 2402).

The process may then contact a manufacturing floor with a number of rollers of the rollers of each wheel assembly (operation 2404). In some illustrative examples, a wheel assembly may initially have only one roller of its rollers contacting the manufacturing floor. In some illustrative examples, a wheel assembly may initially have only two rollers of its rollers contacting the manufacturing floor. In some illustrative examples, a wheel assembly may initially have three or more rollers of its rollers contacting the manufacturing floor. The number of rollers contacting the manufacturing floor may be influenced by at least one of how many rollers the wheel assembly contains, the tilt angle of the wheel plate, the material of the rollers, the spacing of the rollers, the weight of the tool, and the number of wheel assemblies. Further, traction of the rollers with the manufacturing floor may be influenced by the material of the rollers, a tilt angle, the weight of the tool, or other features.

In some illustrative examples, each of the wheel assemblies may have rollers contacting the manufacturing floor. In other illustrative examples, some of the wheel assemblies may not have rollers contacting the manufacturing floor.

Process 2400 may rotate a number of the wheel plates about a respective axis of rotation to move the device in the direction (operation 2406). Afterwards the process terminates. As the tool moves within the manufacturing environment, the wheel plate may rotate such that the rollers of the wheel assembly contacting the manufacturing floor may change.

As the tool moves within the manufacturing environment, how many of the rollers of each wheel assembly contacting the manufacturing floor may change. For example, a wheel assembly may initially have three rollers of its rollers contacting the manufacturing floor. As the tool moves within the manufacturing environment, the rollers may move so that only two rollers of the wheel assembly contact the manufacturing floor. As the tool continues to move within the manufacturing environment, the rollers may move so that only one roller of the wheel assembly contacts the manufacturing floor.

Figure 25:
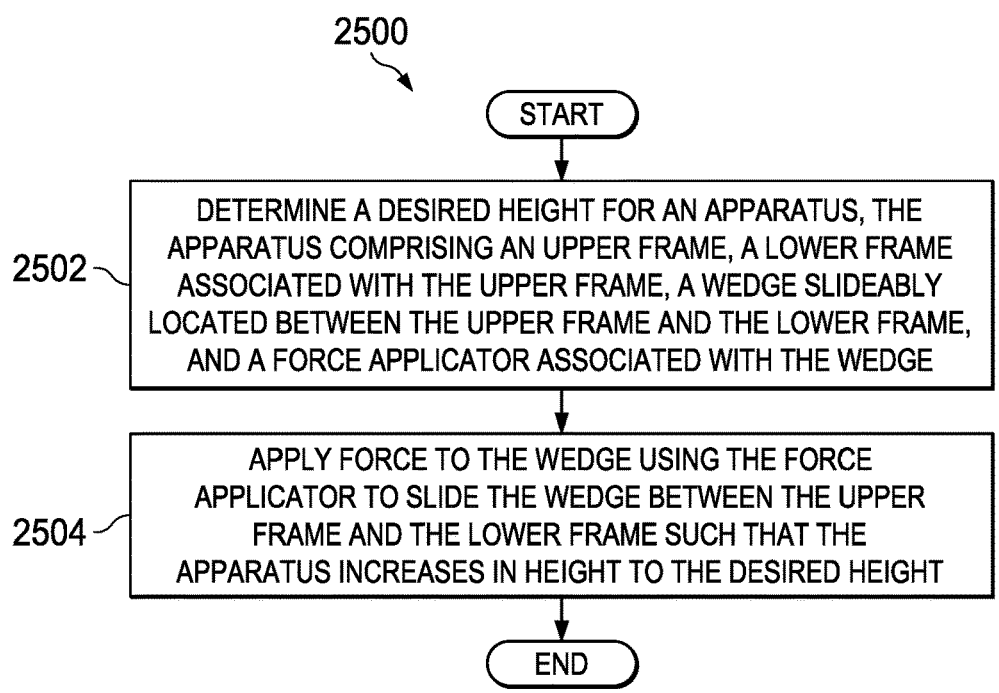
FIG. 25 is an illustration of a flowchart of a process for increasing a height of an apparatus to a desired height in accordance with an illustrative embodiment.

Turning now to FIG. 25, an illustration of a flowchart of a process for increasing a height of an apparatus to a desired height is depicted in accordance with an illustrative embodiment. Process 2500 may begin by determining a desired height for an apparatus, the apparatus comprising an upper frame, a lower frame associated with the upper frame, a wedge slideably located between the upper frame and the lower frame, and a force applicator associated with the wedge (operation 2502). The wedge may be formed of a material selected to provide sufficient friction to hold the wedge relative to the upper frame and the lower frame. In some illustrative examples, the wedge may be formed of at least one of wood, fiberglass, carbon fiber, metal, or other desirable material. In some illustrative examples, the metal may be steel.

Process 2500 may then apply force to the wedge using the force applicator to slide the wedge between the upper frame and the lower frame such that the apparatus increases in height to the desired height (operation 2504). In some illustrative examples, if friction of the wedge holds the wedge relative to the upper frame and the lower frame, the force may be sufficient to overcome friction of the wedge. In other illustrative examples, friction of the wedge may be reduced at least one of prior to or at about the same time as applying the force to the wedge using the force applicator.

In some illustrative examples, the force applicator may take the form of a pneumatic system. In these illustrative examples, the force applicator may be a pneumatic cylinder. In some other illustrative examples, the force applicator may take the form of a mechanical system. Afterwards the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Further, some blocks may not be implemented.

For example, in some illustrative examples, process 2400 may further compare the direction to respective drive direction vectors of the wheel assemblies to form a comparison, wherein each respective drive direction vector of a respective wheel assembly in the wheel assemblies is substantially parallel to an axis of rotation of each roller of the respective wheel assembly. Process 2400 may then determine a movement contribution for each of the wheel assemblies based on the comparison. Afterwards, process 2400 may rotate each of the number of the wheel plates based on the movement contribution for each of the wheel assemblies. In some illustrative examples, process 2400 may maintain each axis of rotation of rollers of each respective wheel assembly in the wheel assemblies parallel to each other central axis of the rollers of the wheel assembly.

In some illustrative examples, process 2500 may also activate an upper air bearing coupled to the upper frame and a lower air bearing coupled to the lower frame to suspend the wedge substantially frictionless prior to applying the force to the wedge. Process 2500 may then deactivate the upper air bearing and the lower air bearing after applying the force to the wedge.

In some illustrative examples, process 2500 may apply a force to the upper frame and the lower frame to bias the upper frame and lower frame towards each other. This force may be applied to the upper frame and the lower frame by a biasing system, such as bias system 2108 of FIG. 21.

Figure 26:
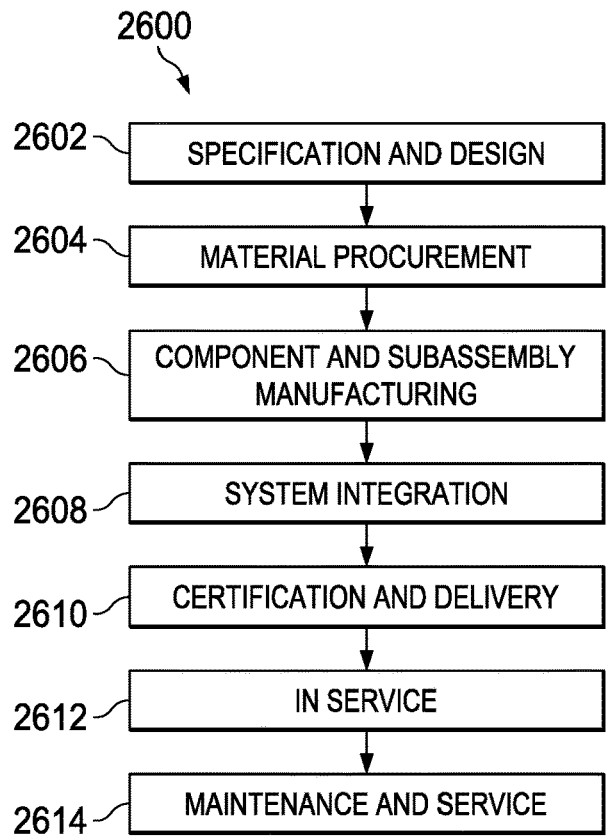
FIG. 26 is an illustration of a block diagram of an aircraft manufacturing and service method in accordance with an illustrative embodiment.
Figure 27:
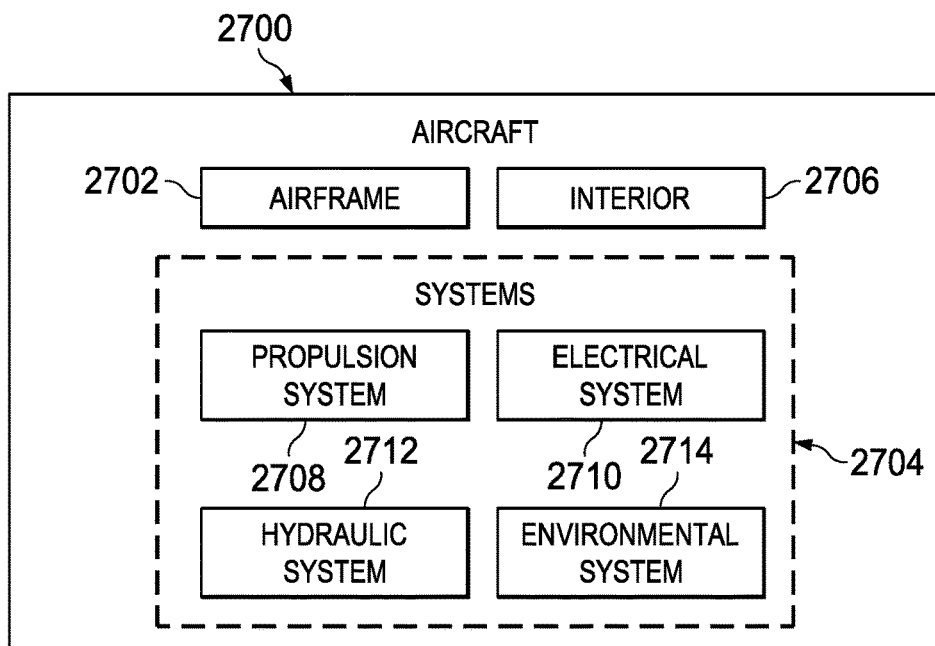
FIG. 27 is an illustration of a block diagram of an aircraft in which an illustrative embodiment may be implemented.

Illustrative embodiments of the disclosure may be described in the context of aircraft manufacturing and service method 2600 as shown in FIG. 26 and aircraft 2700 as shown in FIG. 27. Turning first to FIG. 26, an illustration of a block diagram of an aircraft manufacturing and service method is depicted in accordance with an illustrative embodiment. During pre-production, aircraft manufacturing and service method 2600 may include specification and design 2602 of aircraft 2700 in FIG. 27 and material procurement 2604.

During production, component and subassembly manufacturing 2606 and system integration 2608 of aircraft 2700 in FIG. 27 takes place. Thereafter, aircraft 2700 in FIG. 27 may go through certification and delivery 2610 in order to be placed in service 2612. While in service 2612 by a customer, aircraft 2700 in FIG. 27 is scheduled for routine maintenance and service 2614, which may include modification, reconfiguration, refurbishment, and other maintenance or service.

Each of the processes of aircraft manufacturing and service method 2600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 27, an illustration of a block diagram of an aircraft is depicted in which an illustrative embodiment may be implemented. In this example, aircraft 2700 is produced by aircraft manufacturing and service method 2600 in FIG. 26 and may include airframe 2702 with plurality of systems 2704 and interior 2706. Examples of systems 2704 include one or more of propulsion system 2708, electrical system 2710, hydraulic system 2712, and environmental system 2714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2600 in FIG. 26. One or more illustrative embodiments may be used during component and subassembly manufacturing 2606. For example, aircraft manufacturing and service method 2600 of FIG. 26 may be implemented using number of positioning systems 212 of FIG. 2 to position tool 202 during component and subassembly manufacturing 2606. Further, number of positioning systems 212 may also be used to position tool 202 during maintenance and service 2614.

Although the different illustrative embodiments have been described with respect to tools in manufacturing environments, other illustrative embodiments may be applied to other types of equipment or other environments. For example, without limitation, other illustrative embodiments may be applied to transportation of goods, transportation of vehicles, storage environments, testing environments, or other desirable environments.

The different illustrative embodiments provide for positioning systems for tools or other equipment or components. The positioning systems may each take up smaller volumes than conventional positioning systems.

For example, wheel assemblies, such as wheel assembly 273, may take up a smaller volume than conventional omni-directional wheels. Further, wheel assembly 273 may have a greater surface area contacting manufacturing floor 204 than a conventional wheel system. In some illustrative examples, wheel assembly 273 may have double the contact area on manufacturing floor 204 than a conventional omni-directional wheel of equal height. By increasing the surface area contacting manufacturing floor 204, floor loading may be reduced. Forming wheel assembly 273 using cylindrical rollers 238 may be at least one of less expensive, less complicated to assemble, or less complicated to manufacture than forming conventional wheel systems with conical wheels. Wheel assemblies 214 may have at least the same maneuverability of a conventional omni-directional wheel.

Further, wheel assemblies, such as wheel assembly 273, may have a smaller height than conventional omni-directional wheels. By wheel assembly 273 having a smaller height, tool 202 may be closer to manufacturing floor 204. By having a smaller height, base 210 of tool 202 may push potential obstructions out of the way. By pushing potential obstructions out of the way, tool 202 may have safer movement across manufacturing floor 204. Wheel assemblies 214 may allow tool 202 to have a lower center of gravity than a tool with conventional wheel systems. Having a lower center of gravity may increase the stability of tool 202.

As another example, wedge jack 281 may have a lower height than conventional jacks. Wedge jack 281 may take up less volume than conventional jacks. As a result, using wedge jack 281 may allow for a greater number of components to be associated with base 210 of tool 202 than when a conventional jack is utilized. Wedge jack 281 may be integrated into a design of a tool or system without an undesirable amount of design time. Further, wedge jack 281 may consume no power or air in the locked state. Thus, wedge jack 281 may have fewer manufacturing costs than conventional jacks.

Wedge jack 281 may have a mechanical advantage of about 8:1 which magnifies the force generated by the force generator to increase the height of wedge jack 281. Wedge 284 may have a shallow slope angle such that wedge 284 may remain stationary or "locked" relative to upper frame 282 and lower frame 283 of wedge jack 281.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    an upper frame;
    a lower frame associated with the upper frame;
    a wedge slideably located between the upper frame and the lower frame;
    a force applicator associated with the wedge;
    an upper air bearing coupled to the upper frame; and
    a lower air bearing coupled to the lower frame, wherein the upper air bearing and the lower air bearing are configured to suspend the wedge substantially frictionless.

2. The apparatus of claim 1 further comprising:
    a bias system connected to the upper frame and the lower frame and biasing the upper frame and lower frame towards each other.

3. The apparatus of claim 1 wherein the upper air bearing and the lower air bearing are formed of at least one of sintered bronze, porous carbon, or steel.

4. The apparatus of claim 1, wherein the wedge comprises a roughened metal.

5. The apparatus of claim 1, further comprising:
    a spherical bearing associated with the lower frame; and
    a foot associated with the spherical bearing.

6. The apparatus of claim 1, wherein the force applicator is associated with at least one of a pneumatic force, a hydraulic force, an electro-mechanical force, or a mechanical force.

7. The apparatus of claim 1, wherein the upper air bearing and the lower air bearing are formed of a metal with micro-holes.

8. The apparatus of claim 2, wherein the bias system comprises a spring.

9. The apparatus of claim 2, wherein the bias system comprises one of a dashpot or a polymeric material.

10. An apparatus comprising:
    an upper frame;
    a lower frame;
    a bias system connected to the upper frame and the lower frame and biasing the upper frame and lower frame towards each other;
    an upper air bearing coupled to the upper frame;
    a lower air bearing coupled to the lower frame;
    a foot associated with the lower frame;
    a wedge slideably located between the upper air bearing and the lower air bearing; and
    a force applicator associated with the wedge.

11. The apparatus of claim 10, wherein the upper air bearing and the lower air bearing are configured to suspend the wedge substantially frictionless.

12. The apparatus of claim 10, wherein a position of the wedge relative to the upper frame and the lower frame is maintained by friction when the upper air bearing and the lower air bearing are not activated.

13. The apparatus of claim 10, wherein the upper air bearing and the lower air bearing are formed of a metal with micro-holes.

14. The apparatus of claim 10, wherein the bias system comprises a spring.

15. The apparatus of claim 10, wherein the bias system comprises one of a dashpot or a polymeric material.

16. The apparatus of claim 10 further comprising:
    a spherical bearing associated with the lower frame, wherein the foot is associated with the spherical bearing.

17. The apparatus of claim 10, wherein the force applicator is associated with at least one of a pneumatic force, a hydraulic force, an electro-mechanical force, or a mechanical force.

18. A method comprising:
    determining a desired height for an apparatus, the apparatus comprising an upper frame, a lower frame associated with the upper frame, a wedge slideably located between the upper frame and the lower frame, and a force applicator associated with the wedge;
    activating an upper air bearing coupled to the upper frame and a lower air bearing coupled to the lower frame to suspend the wedge substantially frictionless prior to applying the force to the wedge; and
    applying a force to the wedge using the force applicator to slide the wedge between the upper frame and the lower frame such that the apparatus increases in height to the desired height.

19. The method of claim 18, further comprising:
deactivating the upper air bearing and the lower air bearing after applying the force to the wedge.

20. The method of claim 19 further comprising:
applying a force to the upper frame and the lower frame to bias the upper frame and lower frame towards each other.

\* \* \* \* \*